(12) United States Patent
Seo et al.

(10) Patent No.: US 9,552,092 B2
(45) Date of Patent: Jan. 24, 2017

(54) DISPLAY DEVICE INCLUDING TOUCH SENSOR AND MANUFACTURING METHOD THEREOF

(71) Applicant: Samsung Display Co., Ltd., Yongin, Gyeonggi-Do (KR)

(72) Inventors: Seung Mi Seo, Seoul (KR); Joon Hak Oh, Seoul (KR); Jong Seo Lee, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 223 days.

(21) Appl. No.: 14/030,892

(22) Filed: Sep. 18, 2013

(65) Prior Publication Data

US 2014/0362000 A1 Dec. 11, 2014

(30) Foreign Application Priority Data

Jun. 7, 2013 (KR) .................. 10-2013-0065494

(51) Int. Cl.
  *G06F 3/041* (2006.01)
  *G02F 1/1339* (2006.01)

(52) U.S. Cl.
  CPC ......... *G06F 3/0414* (2013.01); *G02F 1/13394* (2013.01); *G06F 3/0416* (2013.01); *G06F 2203/04103* (2013.01); *G06F 2203/04105* (2013.01); *Y10T 29/42* (2015.01)

(58) Field of Classification Search
  CPC ...... H01L 27/20; H01L 41/22; G02F 1/13394; G02F 1/133377; G02F 1/13338; G02F 1/136227; G06F 3/0414; G06F 2203/04103; G06F 2203/04105; G06F 3/0416
  See application file for complete search history.

(56) References Cited

U.S. PATENT DOCUMENTS

| 4,634,917 A * | 1/1987 | Dvorsky ................ G01B 7/004 310/323.21 |
| 5,343,064 A * | 8/1994 | Spangler ............. B81C 1/00246 257/350 |
| 7,999,264 B2 | 8/2011 | Cho et al. |
| 8,325,143 B2 | 12/2012 | Destura et al. |
| 2003/0038912 A1 * | 2/2003 | Broer ..................... C09K 19/00 349/122 |

(Continued)

FOREIGN PATENT DOCUMENTS

| JP | 09-138385 | 5/1997 |
| JP | 1999-271712 A * | 10/1999 ............. G06F 3/033 |

(Continued)

*Primary Examiner* — Michael J Eurice
(74) *Attorney, Agent, or Firm* — Innovation Counsel LLP

(57) ABSTRACT

The present disclosure relates to a display device including a touch sensor and a manufacturing method thereof, and more particularly, to a display device including a touch sensor using a piezoelectric material and a manufacturing method thereof. The display device includes a first substrate, wherein a plurality of thin film transistors are disposed on the first substrate; a second substrate disposed facing the first substrate; a plurality of piezoelectric elements disposed on the second substrate; and a first sensing electrode overlapping the piezoelectric elements, the first sensing electrode being configured to transfer a sensing voltage generated as a result of pressure applied to the piezoelectric elements.

20 Claims, 21 Drawing Sheets

(56) References Cited

U.S. PATENT DOCUMENTS

| | | | | |
|---|---|---|---|---|
| 2005/0018124 | A1* | 1/2005 | Liao | G02F 1/133377 349/187 |
| 2005/0090029 | A1* | 4/2005 | Yamazaki | H01L 21/288 438/30 |
| 2006/0109222 | A1* | 5/2006 | Lee | G02F 1/13338 345/88 |
| 2006/0109391 | A1* | 5/2006 | Huitema | G09G 3/3611 349/19 |
| 2006/0146267 | A1* | 7/2006 | Choi | G02F 1/133377 349/156 |
| 2006/0209039 | A1* | 9/2006 | Destura | G06F 3/0412 345/173 |
| 2006/0246269 | A1* | 11/2006 | Yukawa | B82Y 10/00 428/209 |
| 2006/0250534 | A1* | 11/2006 | Kutscher | G02F 1/13338 349/41 |
| 2006/0261331 | A1* | 11/2006 | Yukawa | H01L 27/10 257/40 |
| 2006/0290831 | A1* | 12/2006 | You | G02F 1/133514 349/56 |
| 2007/0030221 | A1* | 2/2007 | Pak | G02F 1/13338 345/87 |
| 2007/0194320 | A1* | 8/2007 | Cho | H01L 27/1248 257/72 |
| 2008/0030833 | A1* | 2/2008 | Park | G02F 1/133514 359/259 |
| 2008/0067618 | A1* | 3/2008 | Wang | B82Y 10/00 257/415 |
| 2008/0186434 | A1* | 8/2008 | Yun | G02F 1/1362 349/106 |
| 2008/0246025 | A1* | 10/2008 | Nomura | H01L 27/1214 257/40 |
| 2009/0153368 | A1* | 6/2009 | Hur | G06F 3/0414 341/20 |
| 2009/0256817 | A1* | 10/2009 | Perlin | G06F 3/0233 345/174 |
| 2011/0050604 | A1* | 3/2011 | Kwon | G06F 3/0412 345/173 |
| 2011/0300781 | A1* | 12/2011 | Miyata | G02F 1/133351 451/54 |
| 2012/0138940 | A1* | 6/2012 | Sato | H01L 27/1218 257/59 |
| 2012/0140424 | A1* | 6/2012 | Sato | G02F 1/167 361/749 |
| 2012/0212701 | A1* | 8/2012 | Hwang | G02F 1/13394 349/155 |
| 2013/0021295 | A1* | 1/2013 | Kimura | G02F 1/13338 345/174 |
| 2013/0021544 | A1* | 1/2013 | Fukuyama | G02F 1/13338 349/12 |
| 2013/0050126 | A1* | 2/2013 | Kimura | G02F 1/13338 345/173 |
| 2013/0265256 | A1* | 10/2013 | Nathan | G06F 3/0414 345/173 |

FOREIGN PATENT DOCUMENTS

| | | |
|---|---|---|
| JP | 2005-135027 | 5/2005 |
| JP | 2007-034006 | 2/2007 |
| KR | 10-0719926 | 5/2007 |
| KR | 10-2011-0123093 | 11/2011 |
| KR | 10-2011-0127107 | 11/2011 |
| KR | 10-1079304 | 11/2011 |
| KR | 10-2012-0009677 | 2/2012 |
| KR | 10-1150158 | 5/2012 |
| KR | 10-2012-0115636 | 10/2012 |

* cited by examiner

FIG. 4
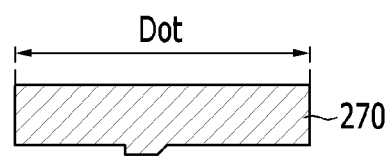

DISPLAY DEVICE INCLUDING TOUCH SENSOR AND MANUFACTURING METHOD THEREOF

CROSS-REFERENCE TO RELATED APPLICATION

This application claims priority to and the benefit of Korean Patent Application No. 10-2013-0065494 filed in the Korean Intellectual Property Office on Jun. 7, 2013, the entire contents of which are incorporated herein by reference.

BACKGROUND (a) Technical Field

The present invention relates to a display device including a touch sensor and a manufacturing method thereof, and particularly, to a display device including a touch sensor using a piezoelectric material and a manufacturing method thereof.

(b) Description of the Related Art

A display device (such as liquid crystal display (LCD), organic light emitting diode display (OLED display), or electrophoretic display) includes an electric field generating electrode and an electro-optical active layer. An LCD may include a liquid crystal layer as the electro-optical active layer; an OLED display may include an organic light emitting layer as the electro-optical active layer, and an electrophoretic display may include a layer having charge-carrying particles as the electro-optical active layer. The electric field generating electrode may be connected to a switching element (e.g. a thin film transistor). When a data signal is applied to the switching element, the electro-optical active layer displays an image by converting the data signal to an optical signal.

In addition to the image display function, a display device may include a touch sensing function. The touch sensing function allows a user to interact with the display device when contact information is received (or sensed) from the user. For example, a display device having a touch sensing function can detect whether an object has approached or made physical contact with the screen of the display device, as well as the actual contact position on the screen (if contact has been made). The touch sensing function may be accomplished using, for example, a touch sensor to sense the change in pressure, charge, or reflected light in the display device when a user touches the screen with a finger or touch pen. The sensed information is then converted into an image signal for displaying an image on the display device.

The touch sensor may include resistive sensors, capacitive sensors, electro-magnetic (EM) sensors, optical sensors, or other types of sensors.

A capacitive touch sensor may include a sensing capacitor having a sensing electrode capable of transferring a sensing signal. Specifically, the capacitive touch sensor can detect whether contact has been made and the actual contact position, by sensing the change in capacitance of the sensing capacitor when a conductive element (such as the user's finger) approaches the sensor.

In a resistive touch sensor, a pair of electrodes spaced apart may come into contact due to external pressure from an object. When the two electrodes make contact at a particular position, the resistance of the electrodes changes. The contact position is then determined by measuring the corresponding change in voltage.

The resistive touch sensor typically works well for a single point of contact. However, if a user simultaneously touches a plurality of points on the screen of the display device, the resistive touch sensor may not be able to obtain touch information pertaining to the plurality of points since the voltages registered across the points are the same. A capacitive type touch sensor may be capable of obtaining information pertaining to a plurality of points. However, the capacitive type touch sensor may not be able to obtain contact information if an insulator makes contact with the screen (e.g. when a user is wearing hand-gloves).

In some cases, it may be useful if the display devices can sense contact strength in addition to contact position. Contact strength refers to the amount of pressure that a user applies on a particular spot on the screen of the display device. However, conventional display devices including the above touch sensors may lack the capability of sensing both contact position and contact strength.

SUMMARY

The present disclosure is directed to address at least the above deficiencies in conventional display devices including the existing touch sensors.

According to some embodiments of the inventive concept, a display device is provided. The display device includes a first substrate, wherein a plurality of thin film transistors are disposed on the first substrate; a second substrate disposed facing the first substrate; a plurality of piezoelectric elements disposed on the second substrate; and a first sensing electrode overlapping the piezoelectric elements, the first sensing electrode being configured to transfer a sensing voltage generated as a result of pressure applied to the piezoelectric elements.

In some embodiments, the display device may further include a protruding portion overlapping the piezoelectric elements and protruding from a plane of the first substrate or the second substrate.

In some embodiments, the protruding portion may include at least one of a spacer for maintaining a distance between the first substrate and the second substrate, a sealant disposed between the first substrate and the second substrate, and a pixel defining layer.

In some embodiments, the display device may further include a second sensing electrode overlapping the first sensing electrode with the piezoelectric elements interposed between the first sensing electrode and the second sensing electrode.

In some embodiments, the first sensing electrode and the second sensing electrode may be disposed extending in different directions.

In some embodiments, the display device may further include an insulating layer disposed between the first sensing electrode and the second sensing electrode for insulating the first sensing electrode from the second sensing electrode.

In some embodiments, the insulating layer may include a contact hole for exposing an end portion of the first sensing electrode, and a contact assistant in contact with the end portion of the first sensing electrode at the contact hole, wherein the contact assistant may be disposed in a same layer as the second sensing electrode.

In some embodiments, at least a portion of the insulating layer corresponding to the piezoelectric elements may be removed.

In some embodiments, the second sensing electrode may include a common electrode formed on the second substrate.

In some embodiments, the display device may further include a sealant disposed between the first substrate and the second substrate for bonding the first substrate and the second substrate; a plurality of neighboring piezoelectric elements disposed overlapping the sealant; and a third sensing electrode overlapping the neighboring piezoelectric elements, the third sensing electrode being configured to transfer a sensing voltage generated as a result of pressure applied to the neighboring piezoelectric elements.

In some embodiments, the third sensing electrode may be disposed in a same layer as the first sensing electrode.

In some embodiments, the display device may further include a second sensing electrode overlapping the first sensing electrode with the piezoelectric elements interposed between the first sensing electrode and the second sensing electrode.

According to some embodiments of the inventive concept, a method of manufacturing a display device is provided. The method includes forming a plurality of thin film transistors on a first substrate; forming a plurality of piezoelectric elements on a second substrate, wherein the second substrate is disposed facing the first substrate; and forming a first sensing electrode overlapping the piezoelectric elements, the first sensing electrode being configured to transfer a sensing voltage generated as a result of pressure applied to the piezoelectric elements.

In some embodiments, the method may further include forming a protruding portion overlapping the piezoelectric elements and protruding from a plane of the first substrate or the second substrate.

In some embodiments, the protruding portion may include at least one of a spacer for maintaining a distance between the first substrate and the second substrate, a sealant disposed between the first substrate and the second substrate, and a pixel defining layer.

In some embodiments, the method may further include forming a second sensing electrode overlapping the first sensing electrode with the piezoelectric elements interposed between the first sensing electrode and the second sensing electrode.

In some embodiments, the method may further include forming an insulating layer disposed between the first sensing electrode and the second sensing electrode for insulating the first sensing electrode from the second sensing electrode.

In some embodiments, the method may further include patterning the insulating layer to form a contact hole for exposing an end portion of the first sensing electrode; and forming a contact assistant in contact with the end portion of the first sensing electrode at the contact hole, wherein the contact assistant may be formed in a same layer as the second sensing electrode.

In some embodiments, the method may further include removing at least a portion of the insulating layer corresponding to the piezoelectric elements.

In some embodiments, forming the second sensing electrode may further include forming a common electrode on the second substrate.

BRIEF DESCRIPTION OF THE DRAWINGS

FIG. 4 is a top plan view illustrating the piezoelectric element(s) in the display devices of FIGS. 1 and 2.

DETAILED DESCRIPTION OF THE EMBODIMENTS

Figure 1:
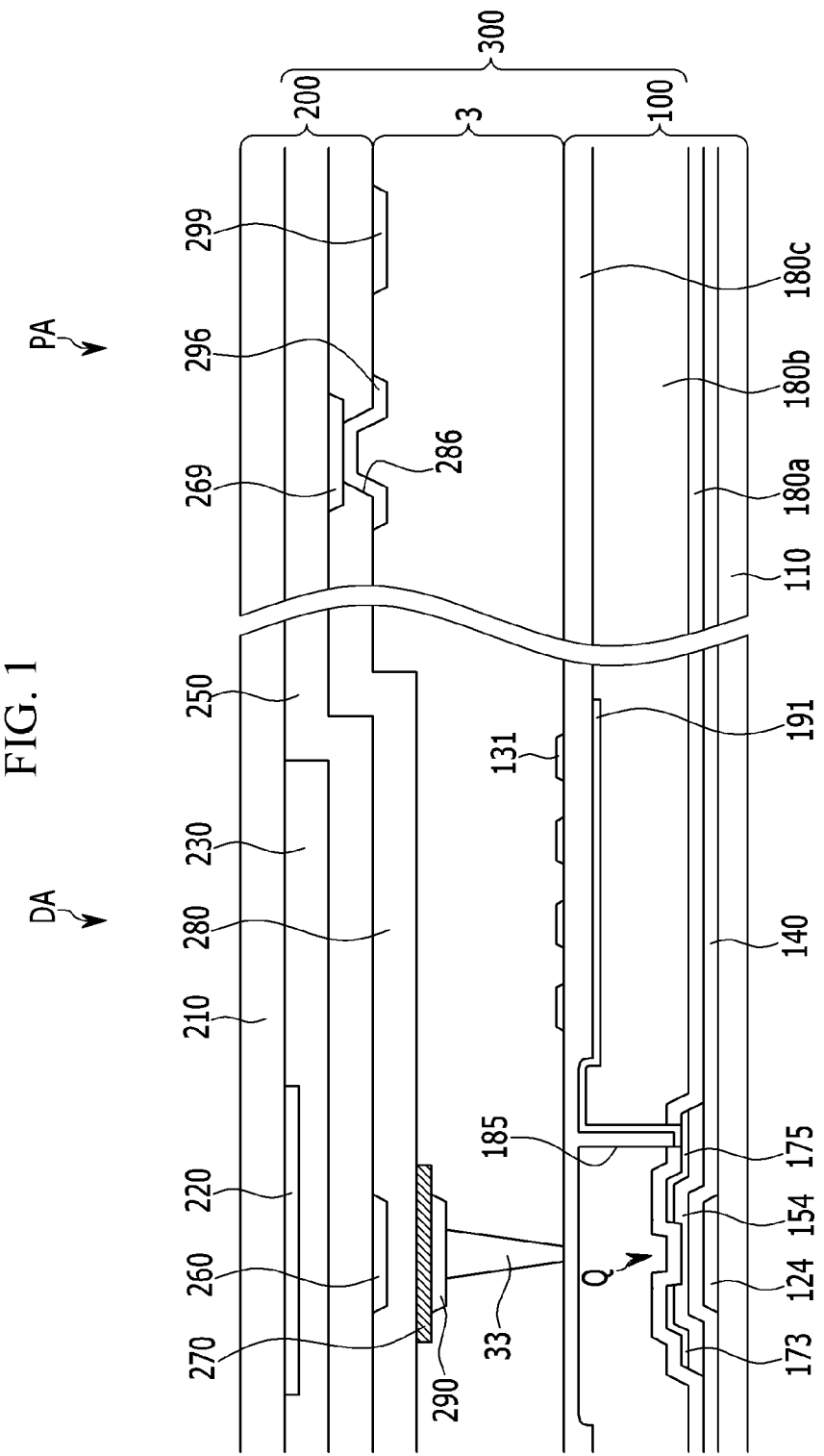
FIGS. 1 and 2 are cross-sectional views of a display device including a touch sensor according to different embodiments of the inventive concept.

The present inventive concept will be described more fully herein with reference to the accompanying drawings, in which different embodiments of the inventive concept are shown. As those skilled in the art would realize, the inventive concept is not limited to the described embodiments, and the embodiments may be modified in various ways without departing from the spirit or scope of the present disclosure.

In the drawings, the thicknesses of the layers, films, panels, areas, etc., have been exaggerated for clarity. Like reference numerals designate like elements throughout the specification. It is noted that when an element such as a layer, film, area, or substrate is referred to as being "on" another element, it can either be disposed directly on the other element, or disposed with one or more intervening elements between the two elements. In contrast, when an element is referred to as being disposed "directly on" another element, there is no intervening element present between the two elements.

FIG. 1 is a cross-sectional view of a display device including a touch sensor according to an embodiment of the inventive concept. The display device in FIG. 1 is based on a liquid crystal display (LCD), but the inventive concept is not limited thereto. For example, in other embodiments, an exemplary display device may include an organic light emitting diode (OLED) display, electrowetting display (EWD), or devices based on other types of display technologies.

With reference to FIG. 1, the display device includes a display panel 300. The display panel 300 includes a lower panel 100 and an upper panel 200 disposed opposite (and facing) the lower panel 100, and a liquid crystal layer 3 disposed between the lower panel 100 and upper panel 200.

The liquid crystal layer 3 includes liquid crystal molecules (not shown) having dielectric anisotropy. In the absence of an electric field in the liquid crystal layer 3, a long column of liquid crystal molecules having positive dielectric anisotropy may be disposed parallel to the lower panel 100 and upper panel 200. The liquid crystal molecules may include nematic liquid crystal molecules having a structure in which a long-shaft direction thereof is spirally twisted from the lower panel 100 reaching up to the upper panel 200.

The display device also includes a backlight unit (not shown) for generating and providing light to the lower panel 100 and upper panel 200. The backlight unit may be disposed at an outer portion of an insulation substrate 110 in the lower panel 100.

As shown in FIG. 1, the display panel 300 includes a display area DA and a peripheral area PA disposed around the display area DA. The display area DA includes a plurality of pixels PX (not shown) for displaying an image. The pixels PX may be disposed on a pixel electrode 191. The peripheral area PA includes a driving portion (not shown) for driving the pixels PX. In some embodiments, a plurality of pad portions connected to the driving portion may be disposed around the peripheral area PA.

Next, the structure of the lower panel 100 in FIG. 1 will be described.

Referring to FIG. 1, the lower panel 100 includes the insulation substrate 110 and a gate electrode 124 disposed on the insulation substrate 110. The gate electrode 124 is connected to a gate line (not shown). The gate line is configured to transfer a gate signal applied to the gate electrode 124, and may be disposed extending in a substantially horizontal direction.

A gate insulating layer 140 is disposed on the gate electrode 124 and insulation substrate 110. The gate insulating layer 140 may be formed of an inorganic insulator, such as silicon nitride (SiNx) or silicon oxide (SiOx).

A semiconductor 154 is disposed on a portion of the gate insulating layer 140. The semiconductor 154 may be disposed overlapping the gate electrode 124. The semiconductor 154 may include amorphous silicon, polysilicon, or oxide semiconductor.

A source electrode 173 and a drain electrode 175 are disposed facing each other on a portion of the semiconductor 154. The source electrode 173 may be connected to a data line (not shown). The data line is configured to transfer a data voltage applied to the source electrode 173, and may be disposed extending in a substantially vertical direction crossing the gate line.

The semiconductor 154, gate electrode 124, source electrode 173, and drain electrode 175 collectively constitute a thin film transistor (TFT) Q. A channel of the TFT Q is disposed on the semiconductor 154 between the source electrode 173 and drain electrode 175.

A first passivation layer 180a is disposed on the source electrode 173, drain electrode 175, gate insulating layer 140, and semiconductor 154. In some embodiments, the first passivation layer 180a may be formed of an organic insulating material. In other embodiments, the first passivation layer 180a may be formed of an inorganic insulating material.

In some embodiments, a second passivation layer 180b may be disposed on the first passivation layer 180a. The second passivation layer 180b may be formed of an organic insulating material. The second passivation layer 180b may serve to planarize a surface of the lower panel 100. Depending on the underlying semiconductor structure(s), the second passivation layer 180b may have different thicknesses at different locations. In some particular embodiments, the second passivation layer 180b may be omitted from the display device.

As shown in FIG. 1, a contact hole 185 is disposed in the first passivation layer 180a and second passivation layer 180b, so as to expose the drain electrode 175. The pixel electrode 191 is disposed on a portion of the second passivation layer 180b, extending into the contact hole 185. The pixel electrode 191 may be electrically connected to the drain electrode 175 through the contact hole 185.

In some embodiments, an insulating layer 180c may be disposed on the second passivation layer 180b and pixel electrode 191.

A common electrode 131 may be disposed on the insulating layer 180c overlapping the pixel electrode 191. As shown in FIG. 1, the common electrode 131 is disposed above the pixel electrode 191. However, the inventive concept is not limited to the aforementioned configuration. For example, in some embodiments, the common electrode 131 may be disposed below the pixel electrode 191. In some other embodiments, the common electrode 131 may be disposed in the upper panel 200 instead of the lower panel 100.

The pixel electrode 191 may be provided in a planar shape, and the common electrode 131 may include a plurality of branch electrodes overlapping the pixel electrode 191. As previously described, the pixels PX may be disposed on the pixel electrode 191. In some embodiments, a plurality of common electrodes 131 are disposed on the pixels PX, with the common electrodes 131 connected together so as to transfer a common voltage Vcom.

As previously mentioned, the data voltage is applied to the source electrode 173. The data voltage is then transferred to the pixel electrode 191, which determines the direction of the liquid crystal molecules in the liquid crystal layer 3. When the common voltage Vcom is applied to the common electrodes 131, an electric field is generated over the liquid crystal layer 3, thereby displaying an image on the display panel 300.

Next, the structure of the upper panel 200 in FIG. 1 will be described.

Referring to FIG. 1, the upper panel 200 includes a substrate 210, and a light blocking member 220 and color filter 230 disposed on the substrate 210. The substrate 210 may be formed of transparent glass or plastic.

The light blocking member 220 may include a black matrix, and serves to reduce light leakage from the pixels PX. The color filter 230 may display any one of the three primary colors red, green, and blue. It is noted that the light blocking member 220 and color filter 230 need not be disposed in the upper panel 200. For example, in some embodiments, at least one of the light blocking member 220 and the color filter 230 may be disposed in the lower panel 100.

As shown in FIG. 1, an overcoat 250 is disposed on the color filter 230 and light blocking member 220. In some embodiments, the overcoat 250 may be omitted if at least one of the color filter 230 and the light blocking member 220 is disposed in the lower panel 100.

A piezoelectric element 270 is disposed on the overcoat 250, and may be formed in an island shape. The piezoelectric element 270 constitutes the transducer element of the touch sensor, and generates charge polarization by piezoelectric effect upon contact by an external object. The piezoelectric element 270 may include at least one of barium titanate (BTO), zinc oxide (ZnO), plumbum-zirconium-titanium (PZT), or other types of piezoelectric materials. The piezoelectric element 270 may be deposited using a sputtering method.

As shown in FIG. 1, a lower sensing electrode 260 is disposed below the piezoelectric element 270 (viewed inverted), and an upper sensing electrode 290 is disposed on the piezoelectric element 270. Both the lower sensing electrode 260 and upper sensing electrode 290 may be formed overlapping the piezoelectric element 270. The sensing electrodes 260/290 are configured to transfer the sensing voltage generated by the charge polarization of the piezoelectric element 270. The contact position and contact strength may be determined by detecting a change in the sensing voltage transferred by the lower sensing electrode 260 or upper sensing electrode 290.

An insulating layer 280 may be disposed between the lower sensing electrode 260 and upper sensing electrode 290.

In some embodiments, a portion of the insulating layer 280 corresponding to the piezoelectric element 270 may be removed, so as to increase the capacitance between the piezoelectric element 270 and sensing electrodes 260/290. Accordingly, a distance between the piezoelectric element 270 and sensing electrodes 260/290 may be reduced due to the removal of a portion of the insulating layer 280.

In some embodiments, the display device may include a plurality of lower sensing electrodes 260 and upper sensing electrodes 290. In those embodiments, the plurality of lower sensing electrodes 260 and upper sensing electrodes 290 may be sequentially scanned to detect the sensing voltage, so as to determine the contact position and contact strength.

The lower sensing electrode 260 or upper sensing electrode 290 may be electrically floated, with the exception of a connection with an external circuit for detecting the sensing voltage.

In some embodiments, the lower sensing electrode 260 may include an end portion 269, and the upper sensing electrode 290 may include an end portion 299. The end portions 269/299 may be disposed in the peripheral area PA of the display panel 300. A contact hole 286 may be disposed in a portion of the insulating layer 280 corresponding to the end portion 269, so as to expose the end portion 269 of the lower sensing electrode 260. A contact assistant 296 may be disposed on the end portion 269, and electrically connected to the end portion 269 via the contact hole 286. The contact assistant 296 may be formed of the same material as the upper sensing electrode 290, and on the same layer as the upper sensing electrode 290. The end portion 269 (of the lower sensing electrode 260) and the end portion 299 (of the upper sensing electrode 290) may serve as terminals to be connected to an external circuit (e.g. a sensing signal processor) for detecting the sensing voltage.

When an external object makes contact with the display panel 300, the external object may make contact with an outer surface of the substrate 210 in the upper panel 200. However, the inventive concept is not limited to the aforementioned configuration. In some other embodiments, the external object may make contact with an outer surface of the insulation substrate 110 in the lower panel 100.

The piezoelectric element 270 may be disposed at a position corresponding to a protruding portion, so as to generate sufficient charge polarization. The protruding portion may be formed protruding from a plane of the display panel 300. The protruding portion may include a spacer for maintaining a distance between two substrates facing each other (in the case of an LCD), a sealant for attaching the two substrates to each other, or a pixel defining layer defining a boundary of a pixel.

In the example of FIG. 1, the piezoelectric element 270 is disposed at a position corresponding to a spacer 33 (the protruding portion), so as to generate sufficient charge polarization. The lower sensing electrode 260 and upper sensing electrode 290 may intersect at a position corresponding to the spacer 33. The spacer 33 may include a column spacer to maintain a gap between the lower panel 100 and upper panel 200. The spacer 33 may be formed on either the lower panel 100 or upper panel 200.

Figure 3:
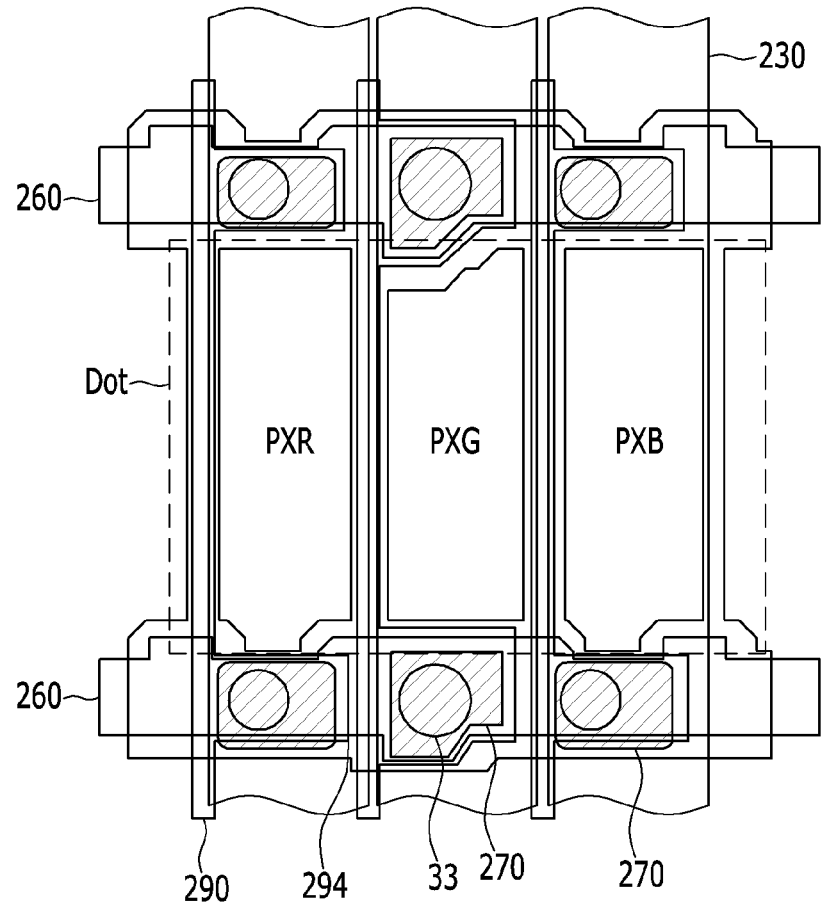
FIG. 3 is a layout view of the plurality of pixels in the display devices of FIGS. 1 and 2.

At least one spacer 33 may be disposed at a position corresponding to a piezoelectric element 270 (e.g. as shown in FIG. 4). In the example of FIG. 3, a spacer 33 may be disposed at a position corresponding to each piezoelectric element 270.

As previously described, a contact position and contact strength may be determined by detecting a change in the sensing voltage transferred by the lower sensing electrode 260 or the upper sensing electrode 290. Specifically, when an external object makes contact with the display panel 300, a peak in the sensing voltage may result due to the charge polarization by the piezoelectric element 270. When the external object loses contact with the display panel 300, reverse polarization momentarily occurs as the charge reverses to its original state. Accordingly, a reverse voltage peak may occur in the sensing voltage. By detecting and analyzing the peaks of the sensing voltage, a start point and an end point (in time) of the contact can subsequently be determined.

In some embodiments, the piezoelectric element and driving elements (e.g. TFT) may be disposed on different substrates, so as to minimize the electric field effect of the driving signal of the driving elements on the sensing voltage generated by the piezoelectric element. For example, as shown in FIG. 1, the piezoelectric element 270 is disposed on the substrate 210 in the upper panel 200, and the TFT Q is disposed on the insulation substrate 110 in the lower panel 100. Accordingly, errors due to electric field interference can be minimized by disposing the piezoelectric element and driving elements on different substrates.

As described in the above embodiments, when an external object makes contact with the display device, a sensing voltage is generated by a piezoelectric effect of a piezoelectric element in the display device. The contact position and contact strength can be determined by detecting the sensing voltage generated. Accordingly, the display device may provide a response to the user based on the contact position and contact strength.

Figure 2:
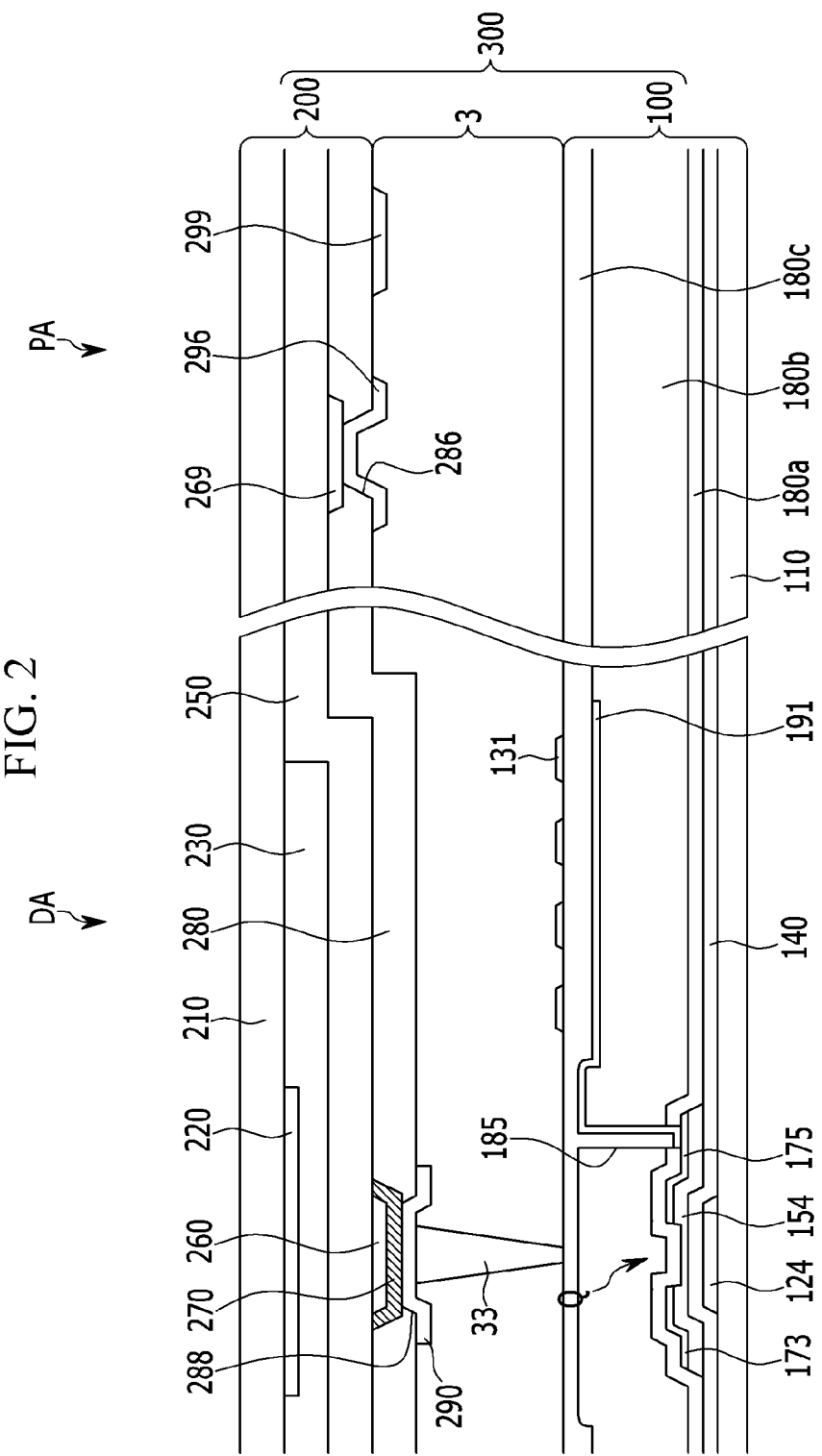

FIG. 2 is a cross-sectional view of a display device including a touch sensor according to another embodiment of the inventive concept. The display device in FIG. 2 is similar to the display device in FIG. 1, except for the shapes and positions of the lower sensing electrode 260, piezoelectric element 270, insulating layer 280, and upper sensing electrode 290. In addition, the display device in FIG. 2 includes a contact hole 288.

In the example of FIG. 1, the insulating layer 280 is disposed between the piezoelectric element 270 and lower sensing electrode 260, with the insulating layer 280 covering a surface of the lower sensing electrode 260. As shown in FIG. 1, a gap exists between the lower sensing electrode 260 and piezoelectric element 270, with the insulating layer 280 filling the gap.

In contrast to FIG. 1, the insulating layer 280 in FIG. 2 is disposed around a stacked structure comprising the piezoelectric element 270 and sensing electrodes 260/290. Unlike the display device in FIG. 1, the display device in FIG. 2 does not include a gap between the lower sensing electrode 260 and piezoelectric element 270. As shown in FIG. 2, the piezoelectric element 270 is disposed directly on the lower sensing electrode 260, and the upper sensing electrode 290 is disposed directly on the piezoelectric element 270 and a portion of the insulating layer 280.

Referring to FIG. 2, the contact hole 288 is disposed in a portion of the insulating layer 280 corresponding to the piezoelectric element 270. The upper sensing electrode 290 may be disposed in contact with the piezoelectric element 270 via the contact hole 288. In some embodiments (not shown), a portion of the insulating layer 280 may remain in the contact hole 288.

FIG. 3 is a layout view illustrating a plurality of pixels in the display devices of FIGS. 1 and 2.

As previously described with reference to FIG. 1, the display panel 300 includes a display area DA and a peripheral area PA disposed around the display area DA. The display area DA includes a plurality of pixels PX for displaying an image. The pixels PX may be disposed on a pixel electrode 191.

As shown in FIG. 3, the pixels PX include a plurality of pixels PXR, PXG, and PXB arranged approximately in a matrix form. Each pixel PX may include at least one switching element Q connected to a driving signal line and at least one pixel electrode 191 connected thereto. The switching element Q may include at least one TFT, and may be disposed in the lower panel 100. The switching element Q may be controlled using a gate signal, so as to transfer a data voltage to the pixel electrode 191. Each of the pixels PXR, PXG, and PXB may display a corresponding image based on the data voltage applied to the pixel electrode 191.

The pixels PX can display full color images via spatial division or temporal division. In spatial division, each pixel PXR, PXG, and PXB may display one of the primary colors in a spatial arrangement. In temporal division, the pixels PXR, PXG, and PXB may alternately display the primary colors over a period of time. A desired color is produced based on a spatial sum or a temporal sum of the displayed primary colors. Examples of primary colors include the three primary colors (red, green and blue) or other colors such as yellow, cyan, and magenta.

Referring to FIG. 3, the adjacent pixels PXR, PXG, and PXB displaying different primary colors may constitute a dot. A dot may also express a full color such as white. The color filter 230 is disposed in each pixel column displaying a primary color.

In the example of FIG. 3, the lower sensing electrode 260 may be disposed extending in a row direction, and the upper sensing electrode 290 may be disposed extending in a column direction to intersect the lower sensing electrode 260. The piezoelectric element 270 may be provided in an island shape, and disposed on an intersecting area between the lower sensing electrode 260 and upper sensing electrode 290. The intersecting area between the lower sensing electrode 260 and upper sensing electrode 290 may be disposed in a row direction or a column direction, based on a pixel (PXR/PXG/PXB) unit or a dot unit. In the example of FIG. 3, the intersecting area between the lower sensing electrode 260 and upper sensing electrode 290 is disposed based on a pixel (PXR/PXG/PXB) unit. The lower sensing electrode 260 or upper sensing electrode 290 may include a protruding portion 294 overlapping the piezoelectric element 270.

As described above, the piezoelectric element 270 is disposed in the intersecting area between the lower sensing electrode 260 and upper sensing electrode 290, and the intersecting area may be disposed in different configurations. Accordingly, the piezoelectric elements 270 may be arranged one per pixel (PXR/PXG/PXB) unit or one per dot unit, in the row direction or column direction. In the example of FIG. 3, the piezoelectric elements 270 are arranged for each pixel PXR, PXG, and PXB, in the row direction as well as the column direction.

FIG. 4 is a top plan view illustrating the piezoelectric element(s) in the display devices of FIGS. 1 and 2.

In contrast to FIG. 3, the piezoelectric elements 270 in FIG. 4 are arranged one per dot unit. In the example of FIG. 4, the piezoelectric element 270 may be disposed extending along the lower sensing electrode 260 or upper sensing electrode 290 over a dot (comprising a plurality of pixels PXR, PXG, and PXB). Since the upper sensing electrodes 290 disposed on a dot column may be connected together, the number of circuits required to detect the sensing voltage may be reduced by disposing the upper sensing electrodes 290 in a dot column (instead of one per pixel). One of ordinary skill in the art would appreciate that a dot column may be defined in different ways, so as to reduce the number of upper sensing electrodes 290 (and circuits) required to detect the sensing voltage.

Figure 5:
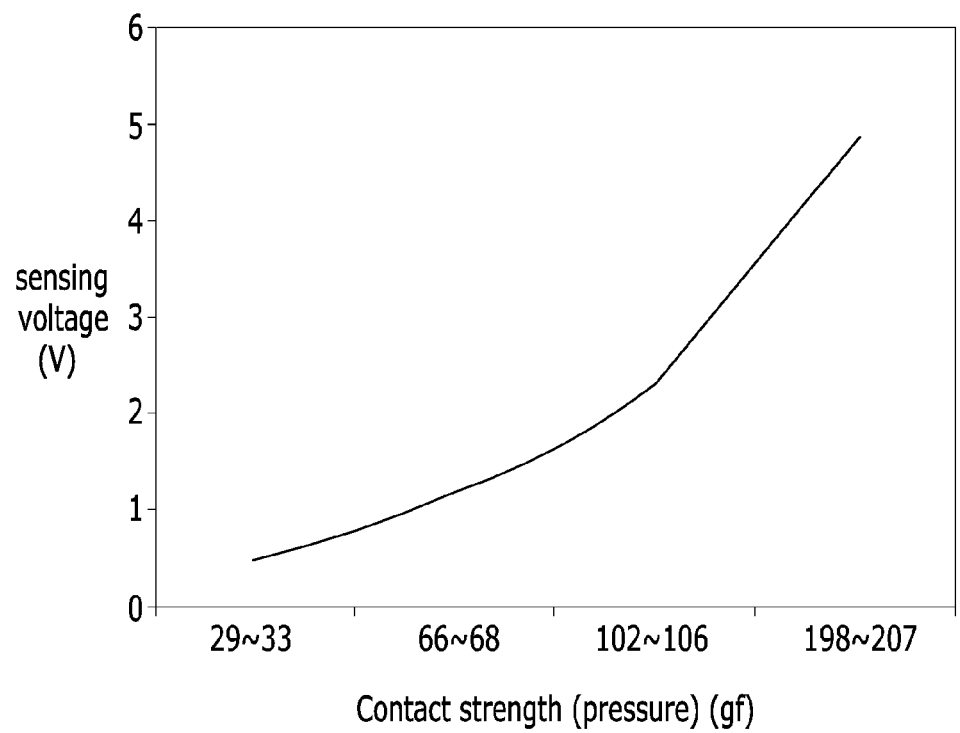
FIG. 5 is a graph showing the change in sensing voltage plotted as a function of the magnitude of contact pressure for the display devices of FIGS. 1 and 2.

FIG. 5 is a graph showing the change in sensing voltage plotted as a function of the magnitude of contact pressure for the display devices of FIGS. 1 and 2.

In FIG. 5, the horizontal axis on the graph denotes the contact strength (as a magnitude of pressure) and the vertical axis denotes the sensing voltage. When a user applies a pressure to the piezoelectric element 270, polarized charge is generated by the piezoelectric element 270. As the user applies more pressure, the amount of polarized charge generated increases, which increases the sensing voltage. Accordingly, the contact position and contact strength can be determined by detecting the changes in the sensing voltage.

Next, an exemplary method of manufacturing the display device of FIG. 1 will be described with reference to FIGS. 6 through 14. In the interest of clarity, FIGS. 6 to 14 focus on illustrating the upper panel 200 (in which the piezoelectric element 270 is disposed) at different stages of fabrication. Specifically, FIGS. 6, 9, and 12 depict cross-sectional views and FIGS. 7, 8, 10, 11, 13, and 14 depict layout views, taken along a same location on the display device of FIG. 1.

Figure 6:
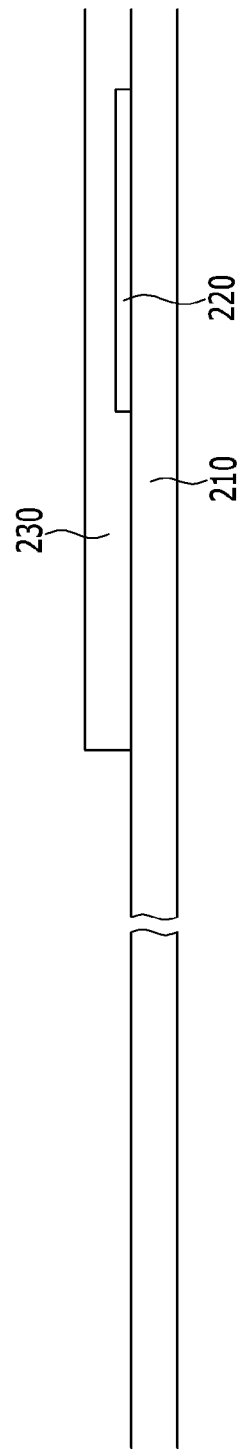
FIGS. 6-14 include cross-sectional and layout views showing the display device of FIG. 1 at different stages of fabrication according to an exemplary method of manufacturing the display device.
Figure 7:
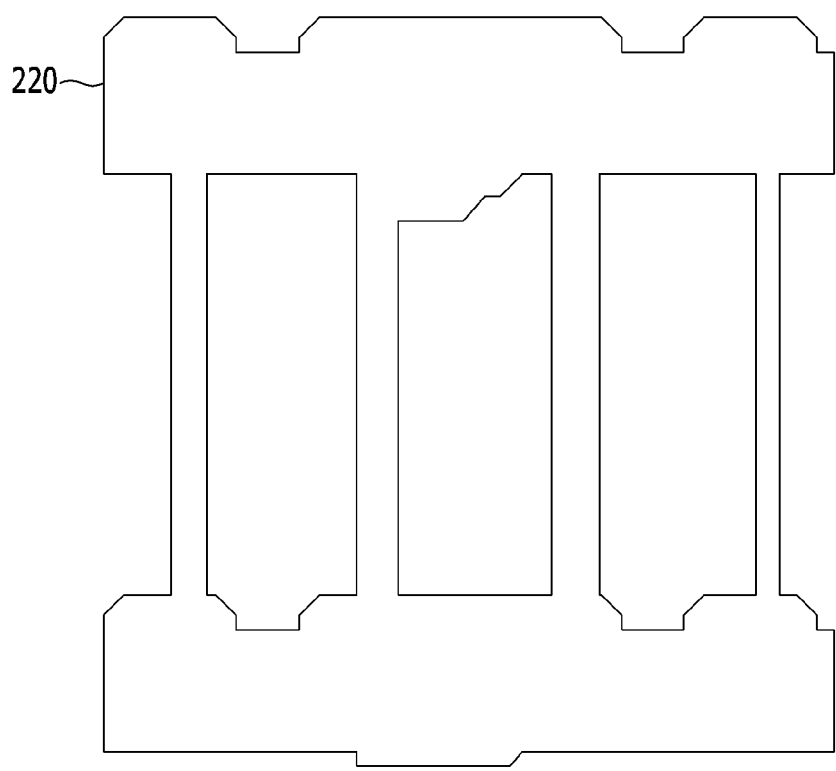
Figure 8:
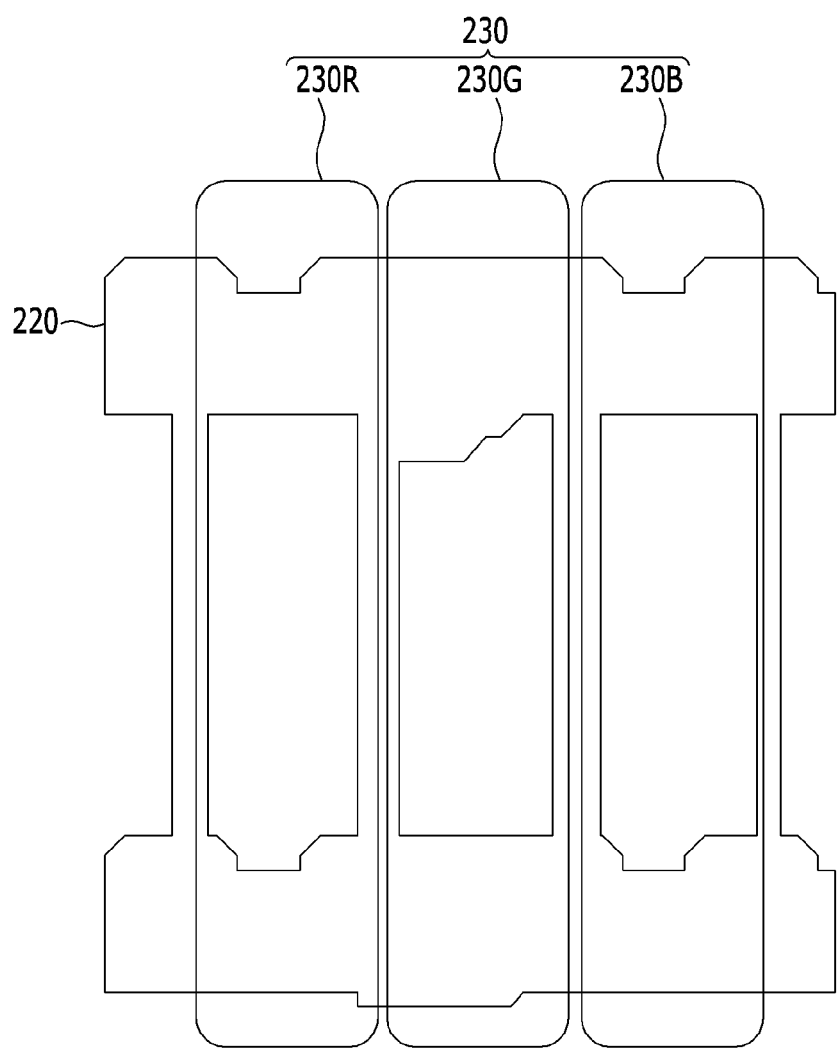

First, referring to FIGS. 6 through 8, a light blocking member 220 and a color filter 230 are formed on a substrate 210. As shown in FIGS. 7 and 8, the color filter 230 may be formed after the light blocking member 220 has been formed. The light blocking member 220 may include a plurality of openings corresponding to a plurality of pixels PXR, PXG, and PXB. The color filter 230 may be formed extending along a pixel column. Each color filter 230 may display one of the three primary colors red, green, and blue. For example, the color filter 230 may include a red color filter 230R formed extending along a red pixel PXR, a green color filter 230G formed extending along a green pixel PXG, and a blue color filter 230B formed extending along a blue pixel PXB. As described previously, in some embodiments, at least one of the light blocking member 220 and color filter 230 may be formed in the lower panel 100.

Figure 9:
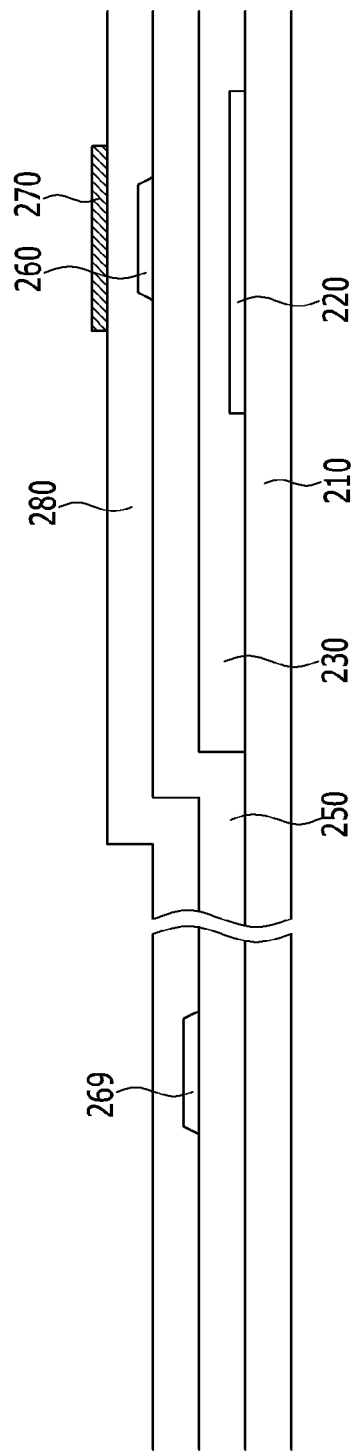
Figure 10:
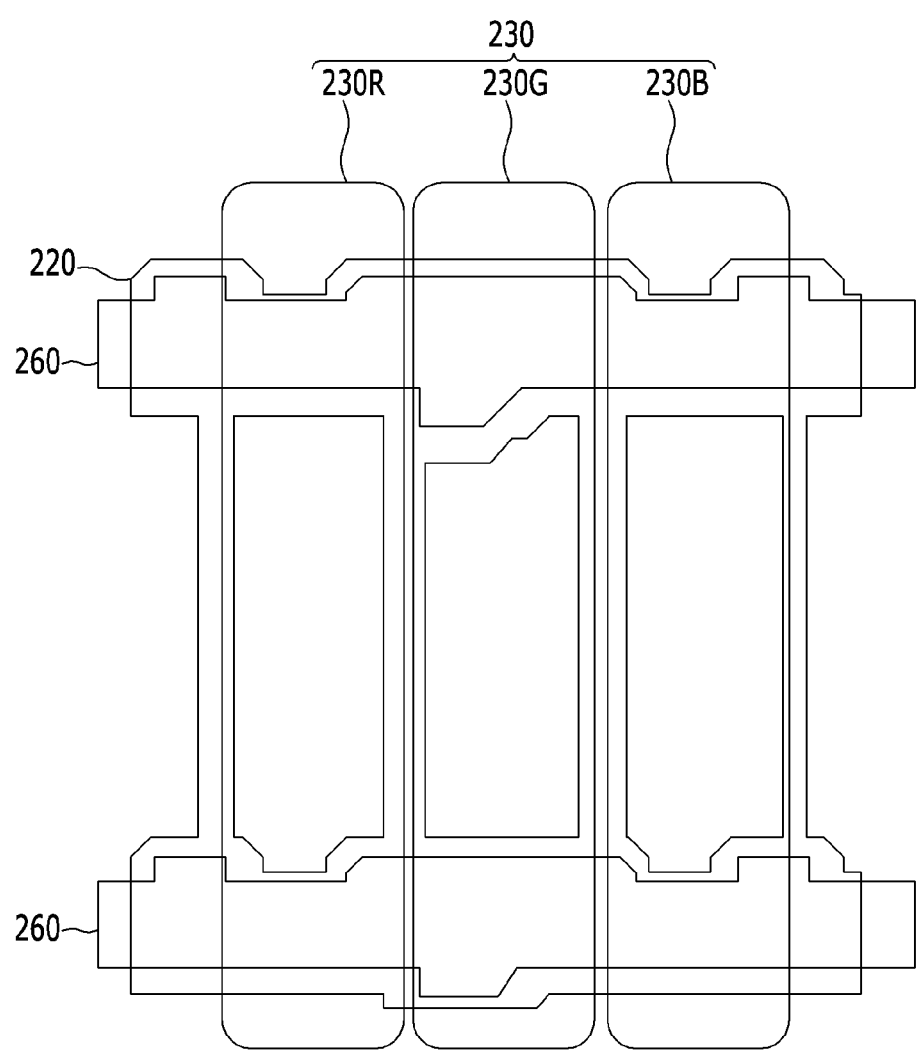

Next, referring to FIGS. 9 and 10, an overcoat 250 is formed on the color filter 230 and light blocking member 220. In some embodiments, the overcoat 250 may be formed of an inorganic insulating material. In other embodiments, the overcoat 250 may be formed of an organic insulating material. A plurality of lower sensing electrodes 260 including an end portion 269 are then formed on the overcoat 250.

Next, an insulating layer 280 is formed on the lower sensing electrodes 260. In some embodiments, the insulating layer 280 may be formed of an inorganic insulating material. In other embodiments, the insulating layer 280 may be formed of an organic insulating material. Next, a plurality of contact holes 286 are formed by patterning the insulating layer 280, so as to expose the end portion 269 of the lower sensing electrodes 260.

Figure 11:
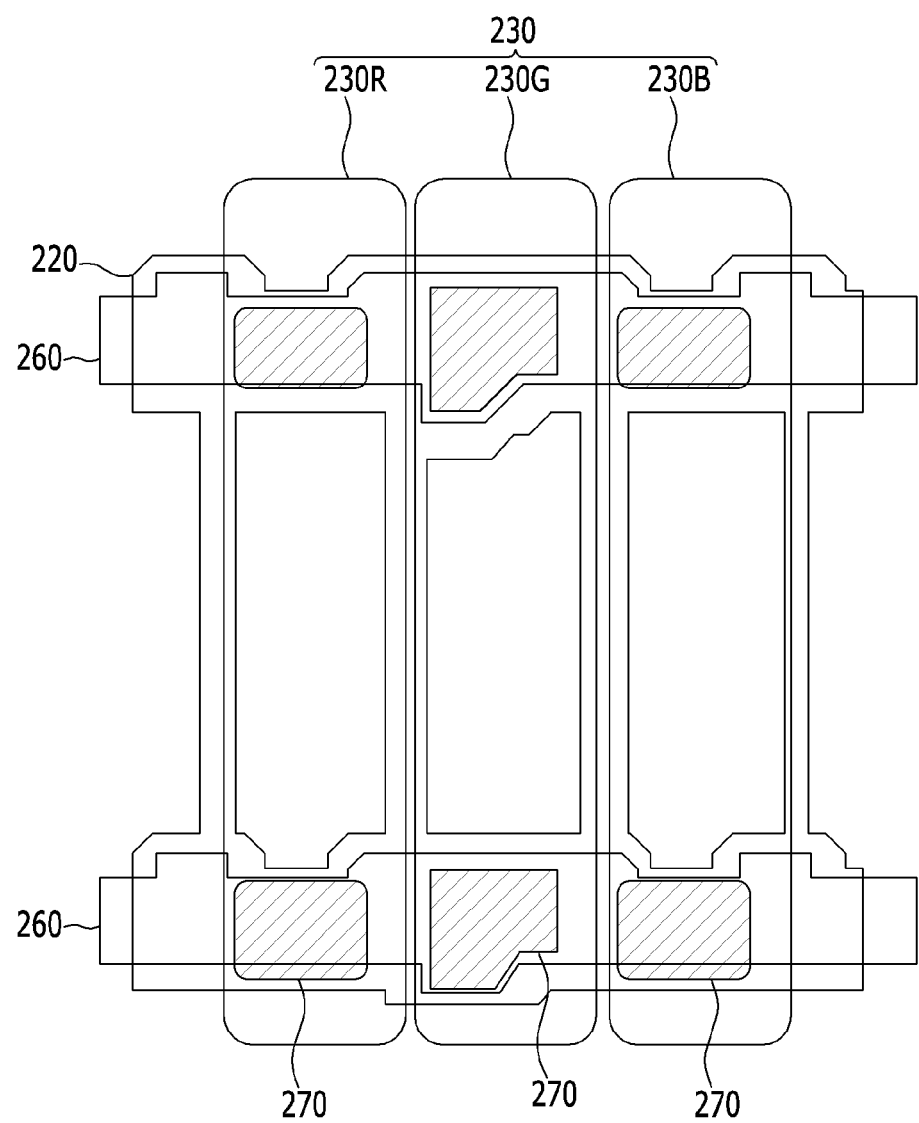
Figure 12:
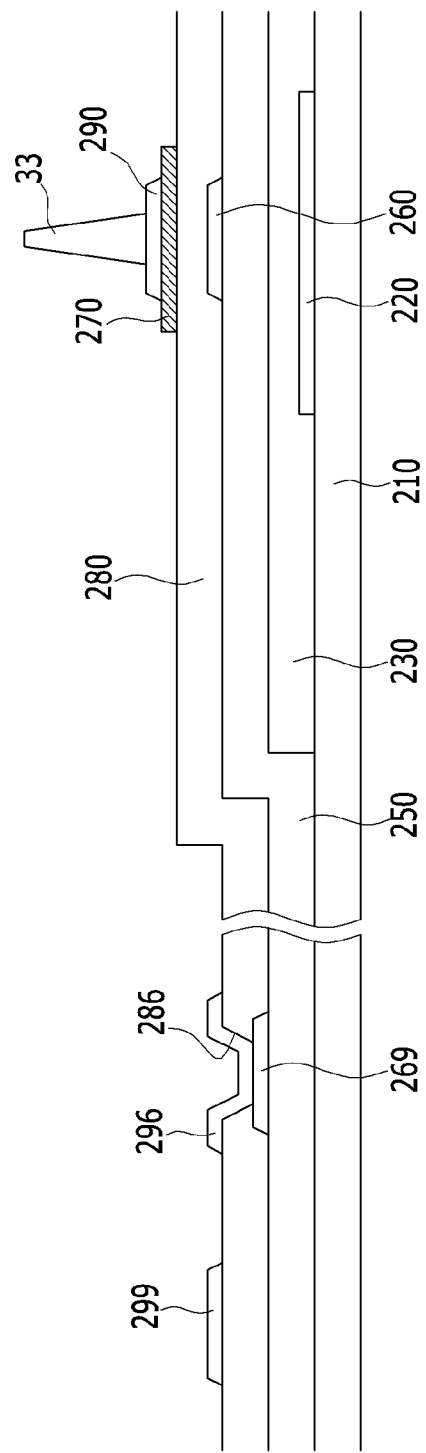

Next, as illustrated in FIGS. 9 and 11, a plurality of piezoelectric elements 270 are formed on the insulating layer 280 overlapping the lower sensing electrodes 260. The piezoelectric elements 270 may be formed by stacking and patterning at least one of barium titanate (BTO), zinc oxide (ZnO), plumbum-zirconium-titanium (PZT), or other similar types of piezoelectric materials. The piezoelectric elements 270 may be deposited using a sputtering method. In some embodiments, the contact holes 286 may be formed in the insulating layer 280 before the piezoelectric elements 270 have been formed. In those embodiments, the piezoelectric elements 270 may be formed after a portion of the insulating layer 280 corresponding to the piezoelectric elements 270 has been removed.

Figure 13:
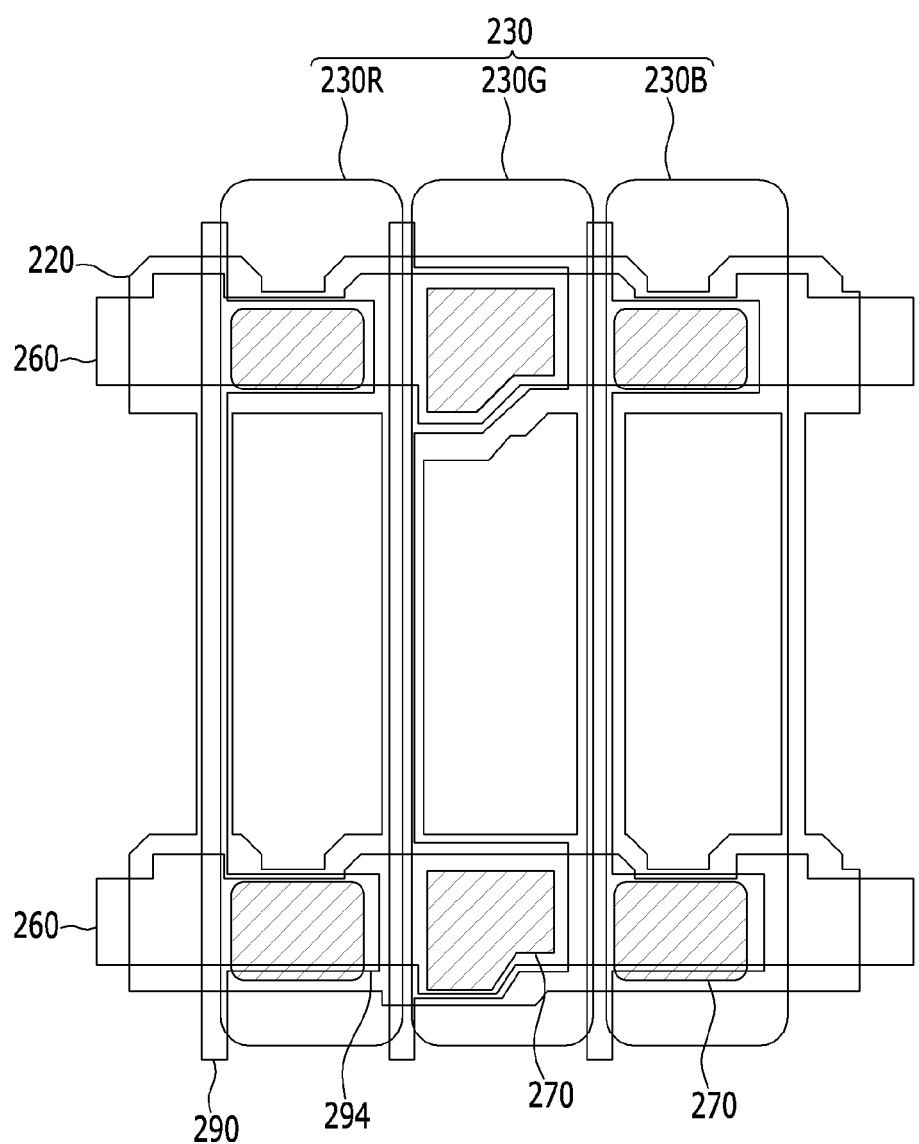
Figure 14:
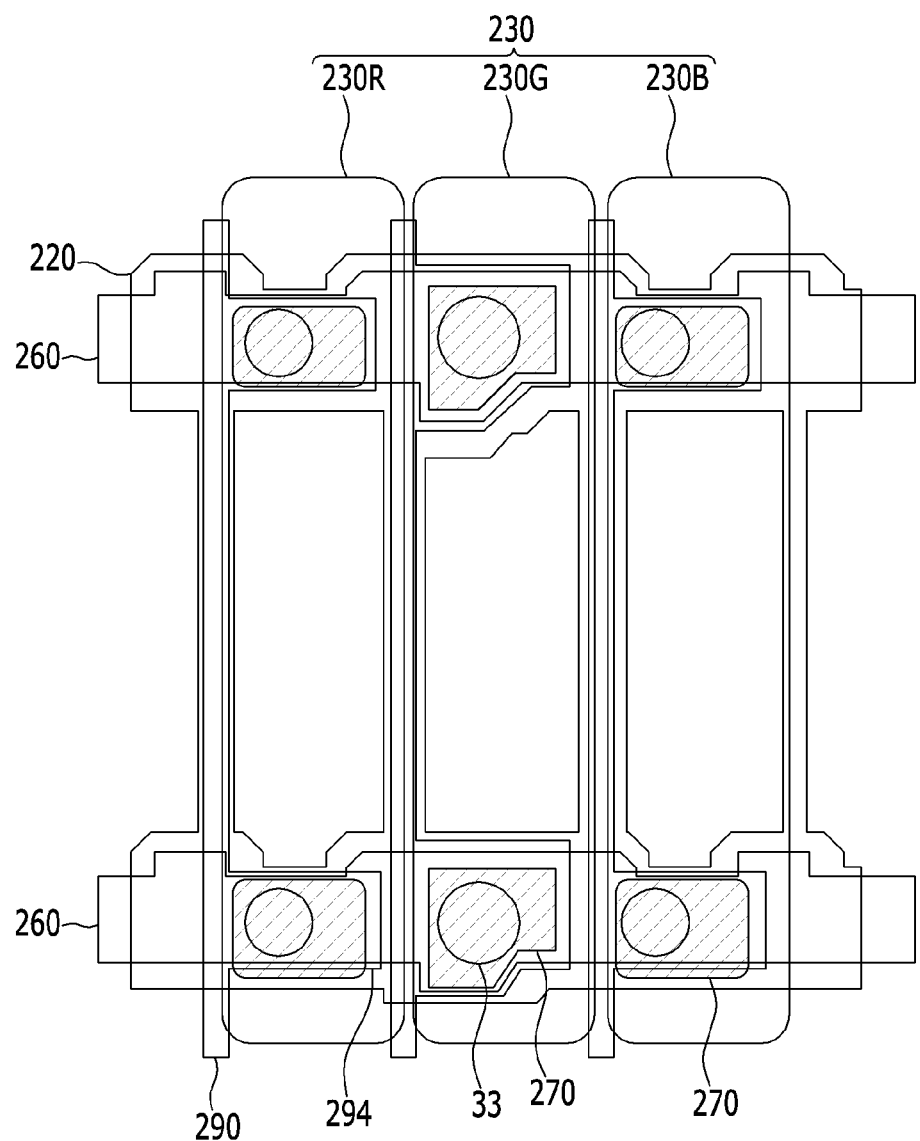

Next, referring to FIGS. 12 and 13, a plurality of upper sensing electrodes 290 and contact assistants 296 are formed on the insulating layer 280 and piezoelectric elements 270. The upper sensing electrodes 290 include an end portion 299. The upper sensing electrode 290 may be formed in contact with the piezoelectric element 270, in an area(s) where the upper sensing electrodes 290 intersect the lower sensing electrodes 260. The contact assistants 296 may be formed in contact with the end portion 269 of the lower sensing electrodes 260 via the contact hole 286, so that the contact assistants 296 are electrically connected to the lower sensing electrodes 260. Next, referring to FIGS. 12 and 14, a plurality of spacers 33 are formed on the upper sensing electrodes 290 (or the insulating layer 280). The spacers 33 may be formed in a row direction or a column direction, based on a pixel (PXR/PXG/PXB) unit or a dot unit.

In some embodiments (e.g. the display device of FIG. 2), the piezoelectric elements 270 may be formed immediately after the lower sensing electrodes 260 have been formed. In those embodiments, a contact hole 288 (shown in FIG. 2) may be formed in the insulating layer 280 at each position corresponding to a piezoelectric element 270, before forming the upper sensing electrodes 290 and contact assistants 296. The upper sensing electrodes 290 may be formed in contact with the piezoelectric elements 270 via the contact holes 288, and the contact assistants 296 may be connected to the end portion 269 of the lower sensing electrodes 260 via the contact holes 286.

Finally, a sealant (not shown) is dispensed between the lower panel 100 and upper panel 200 to bond the lower panel 100 and upper panel 200, thereby producing the display panel 300 of FIG. 1.

Figure 15:
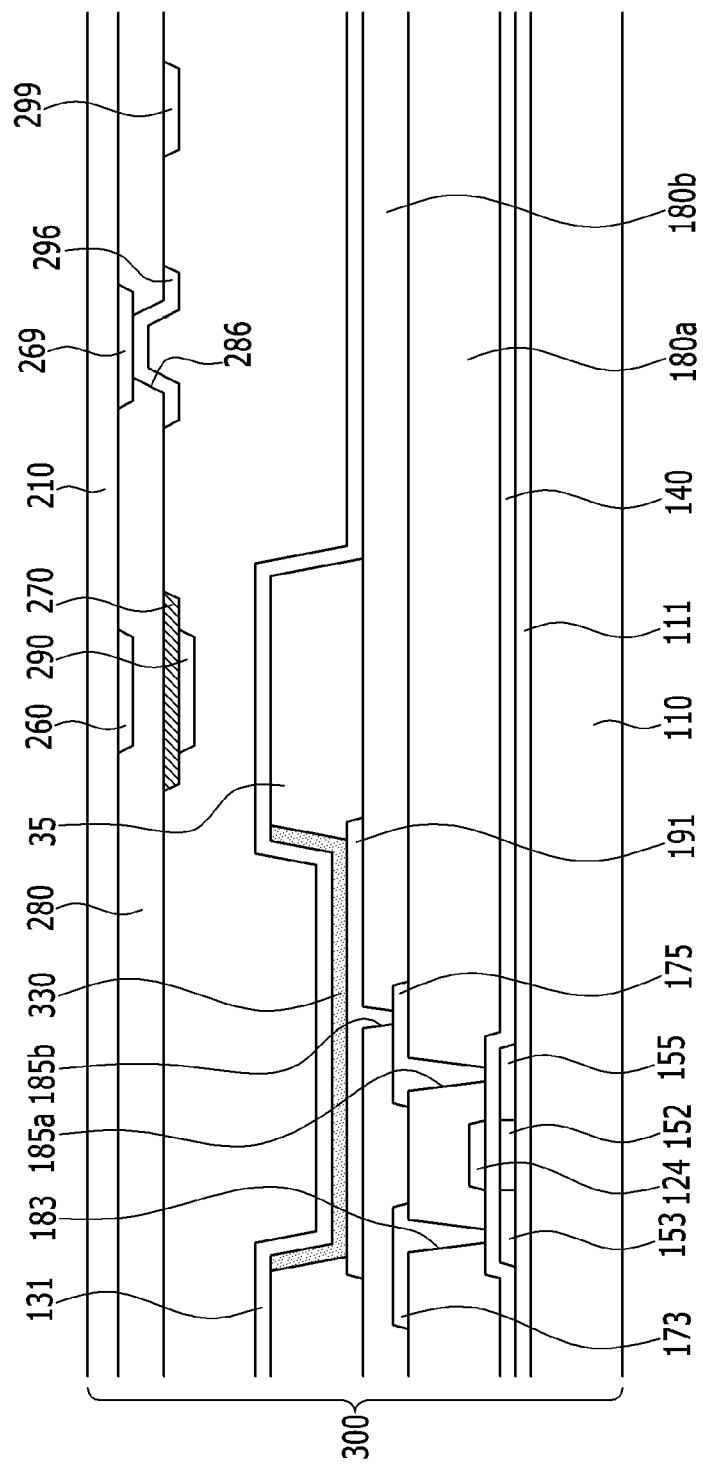
FIG. 15 is a cross-sectional view of a display device including a touch sensor according to another embodiment of the inventive concept.

Next, a display device including a touch sensor according to another embodiment of the inventive concept will be described with reference to FIG. 15. The display device in FIG. 15 is based on an OLED display. Like reference numerals are assigned to like constituent elements of the aforementioned embodiments and thus, detailed description of those elements shall be omitted.

Referring to FIG. 15, a buffer layer 111 may be disposed on an insulation substrate 110. The buffer layer 111 may be formed having a flat surface. The buffer layer 111 may prevent impurities from entering the substrate 110. The buffer layer 111 may be formed of silicon nitride (SiNx), silicon oxide (SiO2), oxide silicon nitride (SiOxNy), or other similar materials. In some particular embodiments, the buffer layer 111 may be omitted.

A semiconductor is disposed on the buffer layer 111. The semiconductor may include a channel area 152, a source area 153, and a drain area 155. The semiconductor may be doped on both sides of the channel area 152. The semiconductor may be formed of polysilicon.

A gate insulating layer 140 is disposed on the semiconductor (channel area 152, source area 153, and drain area 155). The gate insulating layer 140 may be formed of silicon nitride (SiNx) or silicon oxide $SiO_2$.

A gate electrode 124 is disposed on the gate insulating layer 140. The gate electrode 124 may overlap at least a portion of the semiconductor (comprising channel area 152, source area 153, and drain area 155). In particular, the gate electrode 124 is disposed overlapping the channel area 152.

A first passivation layer 180a is disposed on the gate insulating layer 140 and gate electrode 124. Contact holes 183 and 185a are disposed in the first passivation layer 180a exposing the source area 153 and drain area 155 of the semiconductor, respectively.

A source electrode 173 and drain electrode 175 are disposed on the first passivation layer 180a. The source electrode 173 and drain electrode 175 may be connected to the source area 153 and drain area 155 via the contact holes 183 and 185a, respectively.

The channel area 152, source area 153, drain area 155, gate electrode 124, source electrode 173, and drain electrode 175 collectively constitute a thin film transistor (TFT). It is noted that the structure of the TFT is not limited to the above-described embodiment and may be modified in various ways.

In some embodiments, a second passivation layer 180b may be disposed on the source electrode 173 and drain electrode 175. An organic light emitting element may be disposed on the second passivation layer 180b. In particular, the second passivation layer 180b may be disposed having a flat surface so as to improve the light emitting efficiency of the organic light emitting element. A contact hole 185b may be disposed in the second passivation layer 180b to expose the drain electrode 175.

The second passivation layer 180b may include at least one of the following materials: polyacrylates, epoxy, phenolic, polyamides, polyimides, unsaturated polyesters, poly phenylenethers, poly phenylenesulfides, and benzocyclobutene (BCB).

A plurality of pixel electrodes 191 are disposed on the second passivation layer 180b. Each pixel electrode 191 may be connected to the drain electrode 175 via the contact hole 185b in the second passivation layer 180b.

A pixel defining layer 35 is disposed on the second passivation layer 180b. The pixel defining layer 35 includes a plurality of openings for exposing the pixel electrodes 191. Each opening in the pixel defining layer 35 may define a pixel area. An organic light emitting layer 330 may be disposed in the openings of the pixel defining layer 35. A portion of the pixel electrode 191 may be disposed overlapping the pixel defining layer 35. The pixel defining layer 35 may include resin or silica-based inorganic material such as polyacrylates resin and polyimides.

A common electrode 131 is disposed on the pixel defining layer 35 and organic light emitting layer 330. The pixel electrode 191, organic light emitting layer 330, and common electrode 131 collectively constitute an organic light emitting element.

At least one of the pixel electrode 191 and common electrode 131 may include a transparent conductive material, transflective or reflective conductive material, or other similar materials. Depending on the layout of the pixel electrode 191 and common electrode 131, the OLED display may be provided as a top emission, bottom emission, or double-side emission type display.

A substrate 210 may be disposed on the common electrode 131 to seal the display panel 300. In the case of a top emission or double-side emission type OLED display, the substrate 210 may be formed of a transparent material such as glass or plastic. In the case of a bottom emission type OLED display, the substrate 210 may be formed of an opaque material such as metal.

In the example of FIG. 15, a plurality of lower sensing electrodes 260 may be disposed on an inner surface of the substrate 210. The lower sensing electrodes 260 may include an end portion 269.

An insulating layer 280 may be disposed on the lower sensing electrode 260. A contact hole 286 may be disposed in the insulating layer 280 to expose the end portion 269 of the lower sensing electrodes 260.

A plurality of piezoelectric elements 270 are disposed on the insulating layer 280 overlapping a portion of the lower sensing electrodes 260. As previously described, the piezoelectric elements 270 generate charge polarization by a piezoelectric effect when an external object makes contact with the display device. In the example of FIG. 15, the contact (by an external object) may occur on an outer surface of the substrate 210.

A plurality of upper sensing electrodes 290 and contact assistants 296 may be disposed on the piezoelectric elements 270. The upper sensing electrodes 290 may include an end portion 299. A pad portion may be formed when the contact assistants 296 are formed in contact with the end portion 269 of the lower sensing electrodes 260 via the contact hole 286.

It should be noted that the relevant features of the touch sensor previously described in FIGS. 1 through 14 also apply to the embodiment described in FIG. 15.

Next, a display device including a touch sensor according to another embodiment of the inventive concept will be described with reference to FIGS. 16 and 17. Like reference numerals are assigned to like constituent elements of the aforementioned exemplary embodiment and thus, detailed description of those elements shall be omitted.

Figure 16:
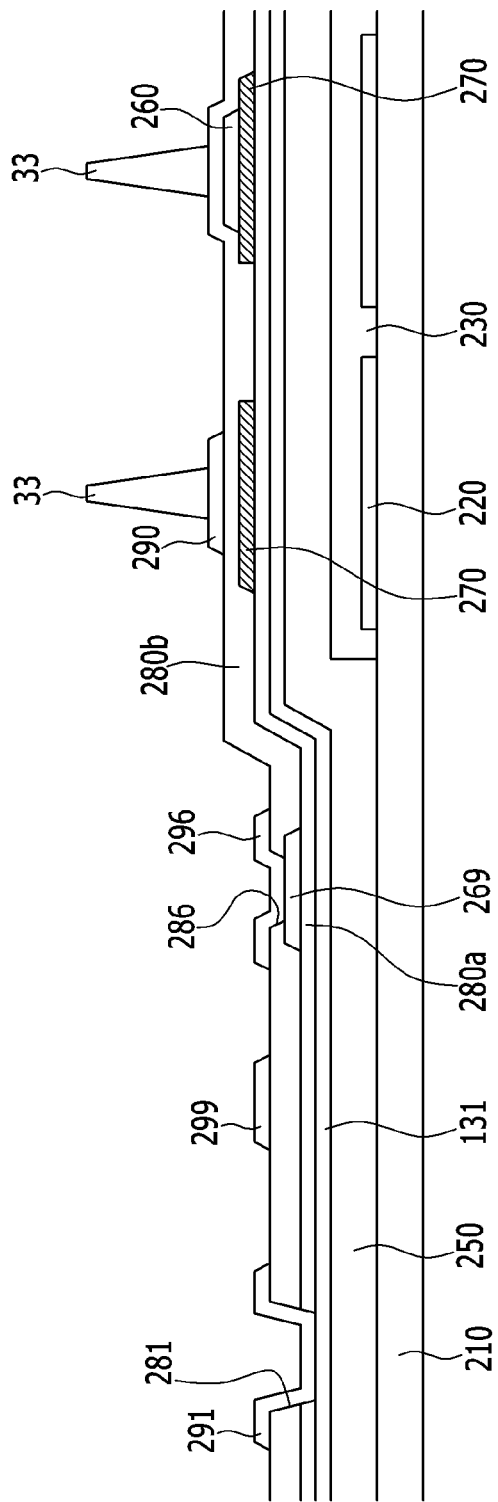
FIG. 16 is a cross-sectional view of a display device including a touch sensor according to another embodiment of the inventive concept.
Figure 17:
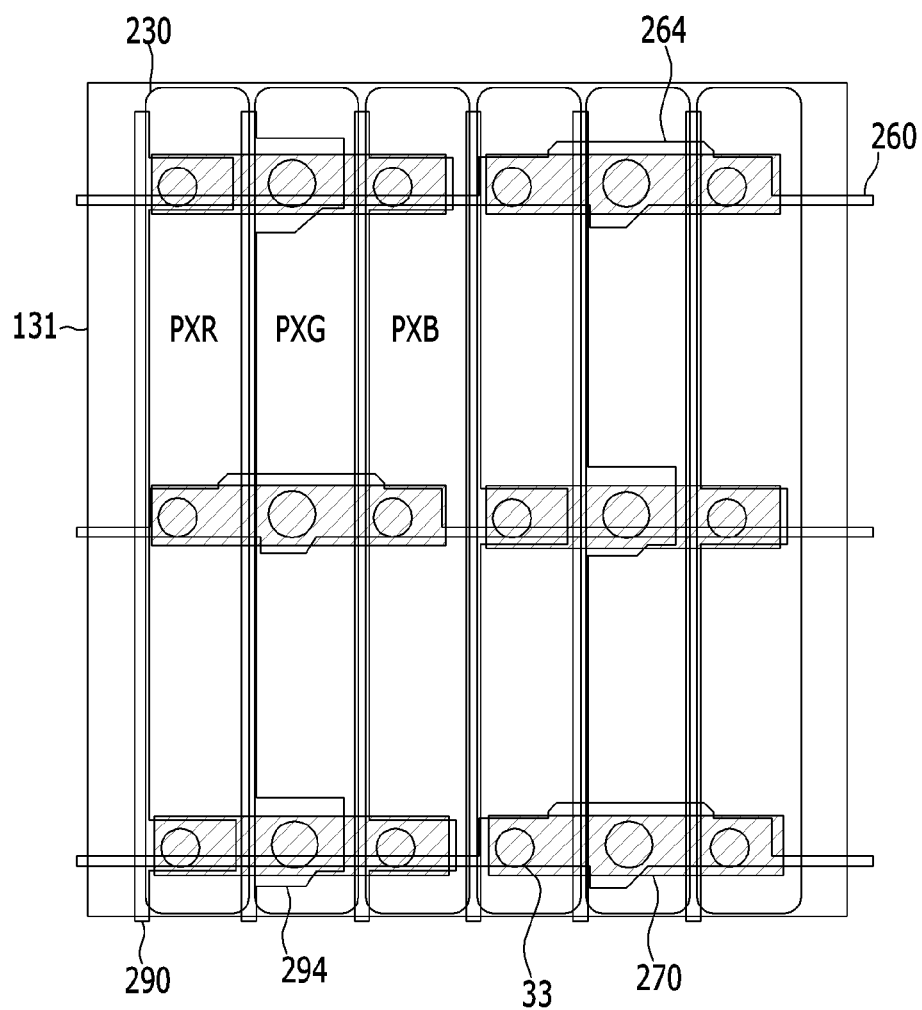
FIG. 17 is a layout view of the plurality of pixels in the display device of FIG. 16.

FIG. 16 depicts a cross-sectional view and FIG. 17 depicts a layout view of an exemplary display device including an LCD.

Referring to FIGS. 16 and 17, a common electrode 131 may be omitted from a lower panel 100. Instead, the common electrode 131 may be disposed on a substrate 210 in an upper panel 200.

A first insulating layer 280a may be disposed on the common electrode 131, and a plurality of island-shaped piezoelectric elements 270 may be disposed on the first insulating layer 280a. The piezoelectric elements 270 may be disposed overlapping the common electrode 131. A plurality of lower sensing electrodes 260 and upper sensing electrodes 290 may be disposed on the piezoelectric elements 270. As shown in FIG. 16, the common electrode 131 may be disposed overlapping the lower sensing electrodes 260 and upper sensing electrodes 290.

In FIG. 17, the piezoelectric elements 270 are arranged one per dot unit. In some other embodiments, the piezoelectric elements 270 may be arranged one per pixel unit, and may be arranged in different configurations to yield different display resolutions.

The lower sensing electrodes 260 including an end portion 269 may be disposed on the piezoelectric elements 270. The lower sensing electrodes 260 may further include a protruding portion 264 overlapping the piezoelectric elements 270.

The lower sensing electrodes 260 may be disposed in direct contact with the piezoelectric elements 270. In some embodiments, a separate insulating layer (not shown) may be disposed between the lower sensing electrodes 260 and piezoelectric elements 270.

A second insulating layer 280b may be disposed on the lower sensing electrodes 260. The second insulating layer 280b may include a plurality of contact holes 286 for exposing the end portion 269 of the lower sensing electrodes 260. Also, the first insulating layer 280a and second insulating layer 280b may include a contact hole 281 for exposing the common electrode 131.

The upper sensing electrodes 290 including an end portion 299 and contact assistants 291 may be disposed on the second insulating layer 280b. The upper sensing electrodes 290 also include a portion that intersects the lower sensing electrodes 260 and overlaps the piezoelectric elements 270. The upper sensing electrodes 290 may include a protruding portion 294 overlapping the piezoelectric elements 270.

In some embodiments, the piezoelectric elements 270 may be disposed overlapping all the lower sensing electrodes 260 and upper sensing electrodes 290. In some other embodiments, the piezoelectric elements 270 may be disposed overlapping at least one of the lower sensing electrodes 260 and upper sensing electrodes 290. In FIGS. 16 and 17, the piezoelectric elements 270 are disposed overlapping at least one of the lower sensing electrodes 260 and upper sensing electrodes 290. Specifically, the piezoelectric elements 270 may alternately overlap the lower sensing electrodes 260 and the upper sensing electrodes 290 along a row direction and a column direction.

A plurality of spacers 33 may be disposed on the upper sensing electrodes 290 at positions corresponding to the plurality of piezoelectric elements 270.

It is noted that separate patterning of the common electrode 131 is not required in the example of FIG. 16. Accordingly, this simplifies the manufacturing process for the display device in FIG. 16.

The lower sensing electrodes 260 or upper sensing electrodes 290 overlapping the piezoelectric elements 270 may transfer a sensing voltage with reference to a common voltage Vcom. A change in pressure caused by the contact of an external object results in charge polarization of the piezoelectric elements 270, thereby changing the sensing voltage of the lower sensing electrodes 260 or upper sensing electrodes 290. The change in sensing voltage may be detected using a circuit (e.g. a sensing signal processor) connected to the pad portion of the lower sensing electrodes 260 or the upper sensing electrodes 290. Accordingly, information on the contact position and contact strength may be obtained based on the sensed voltage.

Next, a display device including a touch sensor according to another embodiment of the inventive concept will be described with reference to FIG. 18.

Figure 18:
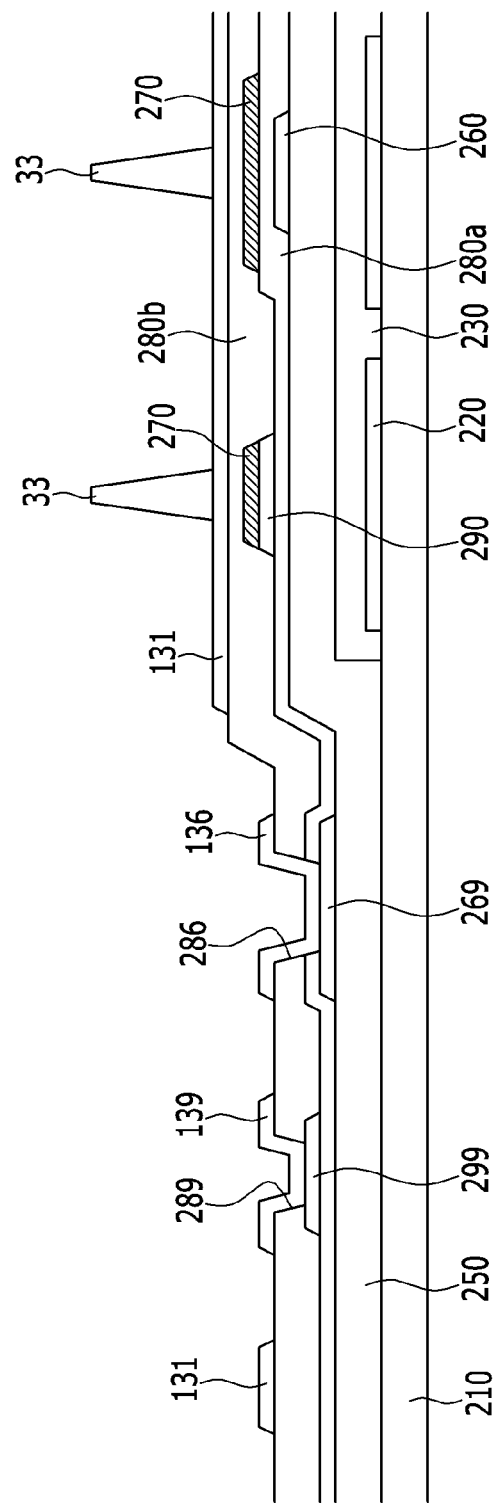
FIG. 18 is a cross-sectional view of a display device including a touch sensor according to another embodiment of the inventive concept.

The display device in FIG. 18 is similar to the display device in FIGS. 16 and 17 except for the differences described below.

In the example of FIG. 18, the first insulating layer 280a is disposed on the lower sensing electrodes 260 (including the end portion 269). The upper sensing electrodes 290 including the end portion 299 are disposed on the first insulating layer 280a. The piezoelectric elements 270 are disposed on the upper sensing electrodes 290. In contrast to FIG. 16, the upper sensing electrodes 290 in FIG. 18 are disposed directly in contact with the piezoelectric elements 270.

Referring to FIG. 18, the second insulating layer 280b is disposed on the piezoelectric elements 270. A common electrode 131 and a plurality of contact assistants 136 and 139 are disposed on the second insulating layer 280b. The common electrode 131 may be disposed around a peripheral area PA of a display panel 300. A common voltage Vcom may be applied to the common electrode 131. The common electrode 131 may reduce noise in the sensing voltage by shielding the piezoelectric elements 270 from external electromagnetic waves.

The contact assistants 136 may be electrically connected to the end portion 269 of the lower sensing electrodes 260 via a contact hole 286 in the first insulating layer 280a and second insulating layer 280b. The contact assistants 139 may be electrically connected to the end portion 299 of the upper sensing electrodes 290 via a contact hole 289 in the second insulating layer 280b. The contact assistants 136 and 139 may be disposed on a same layer as the common electrode 131, and may be formed of the same material as the common electrode 131.

Next, a display device including a touch sensor according to a further embodiment of the inventive concept will be described with reference to FIGS. 19 through 21.

Figure 19:
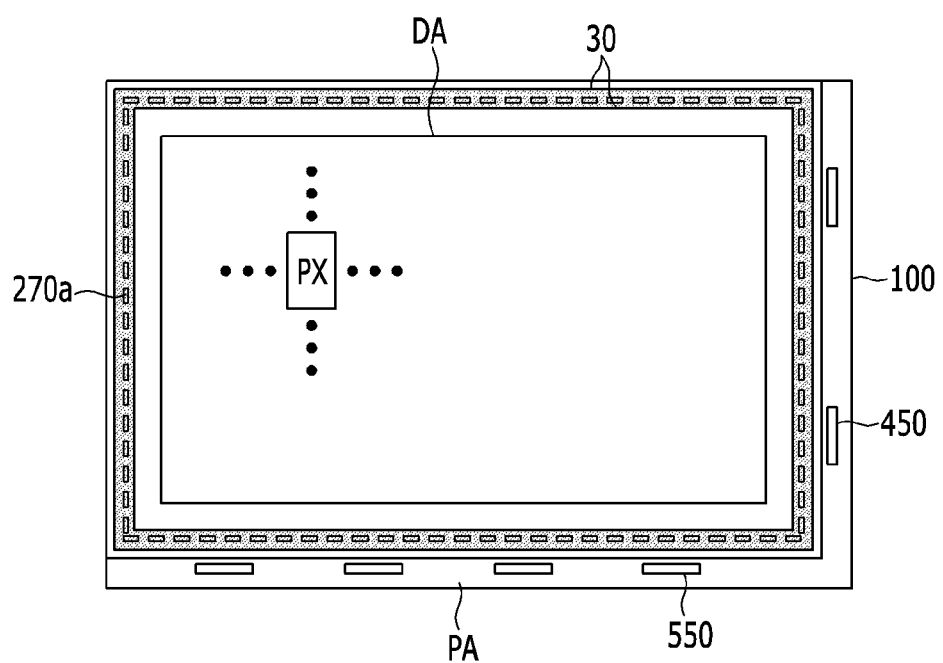
FIG. 19 is a layout view of a display device including a touch sensor according to another embodiment of the inventive concept.

The display device in FIG. 19 includes the various embodiments described above. In addition, the display device in FIG. 19 includes a sealant 30 for bonding the lower panel 100 and upper panel 200 and for sealing the liquid crystal layer 3 to form an LCD. The sealant 30 may be disposed in a peripheral area PA that surrounds a display area DA.

As mentioned previously, a plurality of driving portions (for transferring a driving signal to the display area DA) may be disposed in the peripheral area PA of a lower panel 100. For example, as illustrated in FIG. 19, a plurality of gate driving circuits 450 (for transferring a gate signal to a gate line of the display area DA) may be disposed in the left or right peripheral area PA of the lower panel 100. In addition, a plurality of data driving circuits 550 (for transferring a data signal to a data line of the display area DA) may be disposed in the upper or lower peripheral area PA of the lower panel 100.

In the example of FIG. 19, a peripheral piezoelectric element 270a may be disposed between the sealant 30 and substrate 210 on the upper panel 200. A separate sensing electrode 290a may be disposed on or below the peripheral piezoelectric element 270a. An insulating layer (not shown) may be disposed between the peripheral piezoelectric element 270a and sensing electrode 290a. In some embodiments, an insulating layer need not be disposed between the peripheral piezoelectric element 270a and sensing electrode 290a.

The sensing electrode 290a may transfer a sensing voltage that is generated due to charge polarization of the peripheral piezoelectric element 270a.

Figure 20:
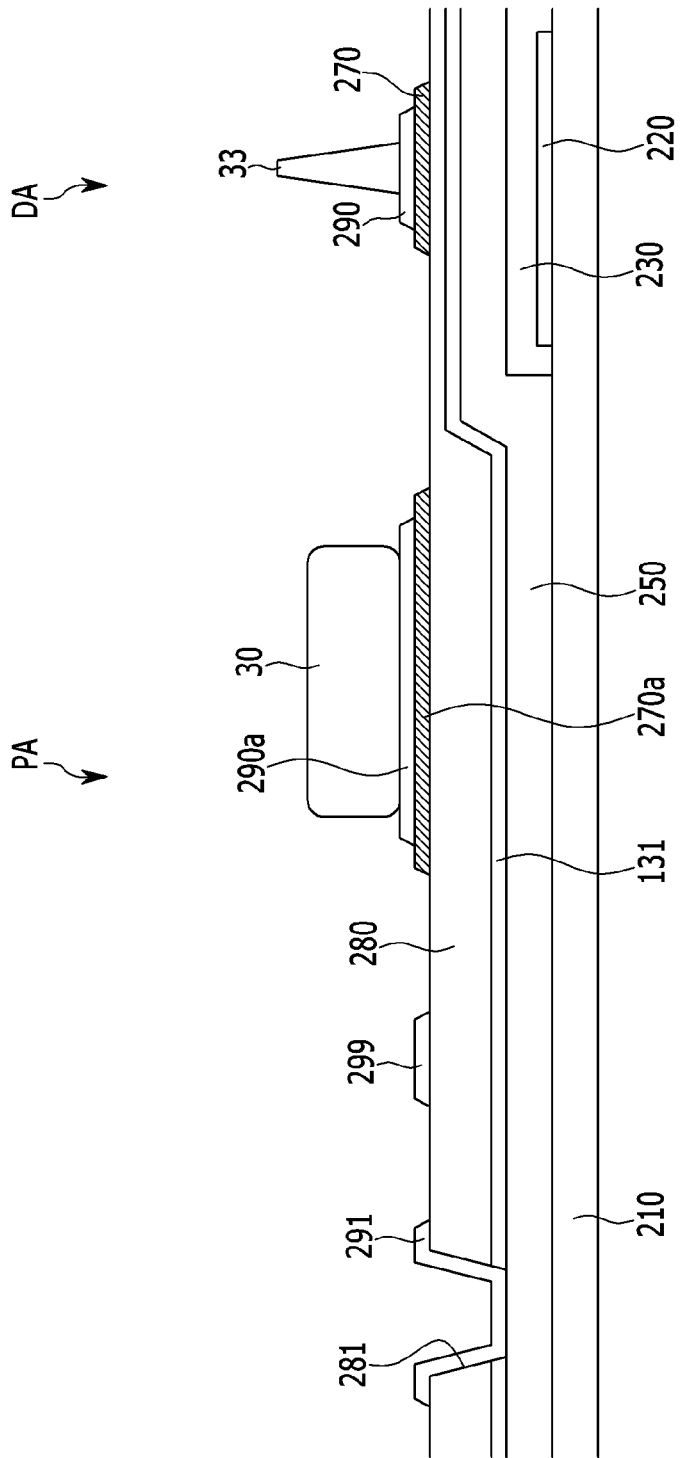
FIG. 20 is a cross-sectional view of the display device of FIG. 19.
Figure 21:
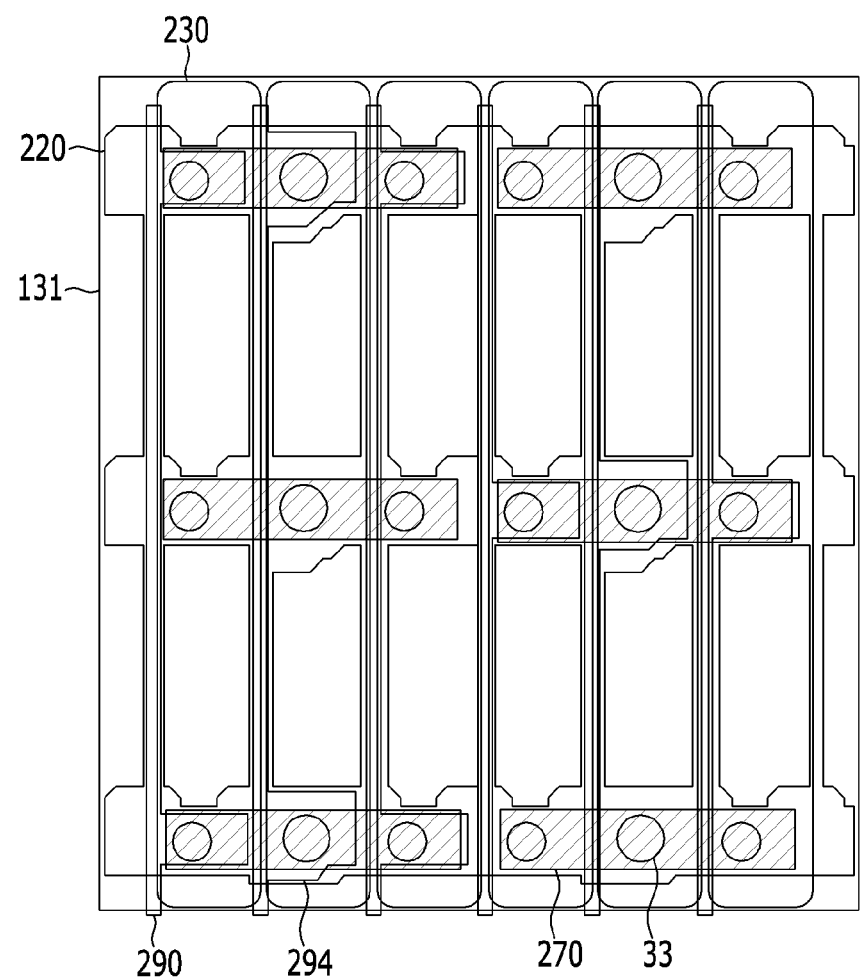
FIG. 21 is a layout view of the plurality of pixels in the display device of FIG. 19.

The display device illustrated in FIGS. 20 and 21 is similar to the display device in FIGS. 16 to 18 except for the differences described below.

Referring back to FIG. 18, the common electrode 131 is disposed on the overcoat 250 formed on the substrate 210, and the insulating layer 280 is disposed on the common electrode 131. The insulating layer 280 includes the contact hole 281 for exposing the common electrode 131. In the display device of FIGS. 20 and 21, one of the lower sensing electrodes 260 and upper sensing electrodes 290 are formed on the substrate 210. As such, the common electrode 131 in FIGS. 20 and 21 are disposed facing and overlapping one of the lower sensing electrodes 260 and upper sensing electrodes 290.

Referring to FIG. 20, a plurality of island-shaped piezoelectric elements 270 are disposed in the display area DA, and a plurality of island-shaped peripheral piezoelectric elements 270a are disposed in the peripheral area PA. The piezoelectric elements 270 and 270a are disposed on an insulating layer 280.

Also, a plurality of upper sensing electrodes 290 including an end portion 299 are disposed on the piezoelectric elements 270, and a plurality of sensing electrodes 290a are disposed on the peripheral piezoelectric elements 270a. A contact assistant 291 is disposed in contact with the common electrode 131 via the contact hole 281. In some embodiments (not shown), the upper sensing electrodes 290 and sensing electrodes 290a may be disposed below the piezoelectric element 270 and the peripheral piezoelectric element 270a. The upper sensing electrodes 290 and sensing electrodes 290a may be disposed directly in contact with the piezoelectric elements 270 and the peripheral piezoelectric elements 270a, respectively. In some embodiments (not shown), a separate insulating layer may be disposed between the upper sensing electrodes 290 and piezoelectric elements 270, and between the sensing electrodes 290a and peripheral piezoelectric elements 270a.

In some embodiments (not shown), a lower sensing electrode and the sensing electrodes 290a may be disposed below the piezoelectric elements 270 and peripheral piezoelectric elements 270a.

In some embodiments (not shown), the sensing electrodes 290a overlapping the peripheral piezoelectric element 270a may be connected to an external circuit (e.g. a sensing signal processor) via a separate lead line.

A plurality of spacers 33 may be disposed on the upper sensing electrodes 290 in the display area DA, and the sealant 30 may be disposed on the sensing electrodes 290a in the peripheral area PA. The upper panel 200 is then brought into contact with the lower panel 100 with the sealant 30 disposed between the upper panel 200 and lower panel 100. When a pressure is applied on an outer surface of the upper panel 200, the pressure will be transferred to the peripheral piezoelectric elements 270a. When the pressure is removed, a change in the sensed voltage may be transferred via the sensing electrodes 290a. Contact information is then obtained by processing the sensing voltage transferred by the sensing electrodes 290a in the peripheral area PA and the sensing voltage from the piezoelectric elements 270 in the display area DA. Accordingly, greater accuracy in contact information may be obtained using the above-described embodiment.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the present disclosure.

What is claimed is:
1. A display device comprising:
a pixel electrode electrically connected to a thin film transistor disposed on a first substrate;
a protruding portion protruding from a second substrate and overlapping the thin film transistor;
a piezoelectric element disposed on the second substrate and overlapping the protruding portion;
a first sensing electrode overlapping the piezoelectric element; and
a second sensing electrode overlapping the first sensing electrode, wherein the first sensing electrode and the second sensing electrode intersect at a position corresponding to the protruding portion and the thin film transistor, wherein the piezoelectric element, the first sensing electrode, and the second sensing electrode that are disposed on the second substrate are separated from the thin film transistor that is disposed on the first substrate by the protruding portion, and wherein the first sensing electrode and the second sensing electrode are configured to transfer a sensing voltage generated by the piezoelectric element in response to a pressure applied to the piezoelectric element caused by a touch.

2. The display device of claim 1,
wherein the second substrate faces the first substrate, and
wherein the protruding portion comprises a spacer for maintaining a distance between the first substrate and the second substrate.

3. The display device of claim 1,
wherein the piezoelectric element is interposed between the first sensing electrode and the second sensing electrode.

4. The display device of claim 1, wherein:
the first sensing electrode and the second sensing electrode are disposed extending in different directions.

5. The display device of claim 1, wherein:
the second sensing electrode comprises a common electrode formed on the second substrate.

6. The display device of claim 1, further comprising:
a second sensing electrode overlapping the first sensing electrode, wherein the piezoelectric element is interposed between the first sensing electrode and the second sensing electrode.

7. The display device of claim 1, further comprising:
an insulating layer disposed between the first sensing electrode and the second sensing electrode for insulating the first sensing electrode from the second sensing electrode.

8. The display device of claim 7, wherein:
the insulating layer comprises a contact hole for exposing an end portion of the first sensing electrode, and
a contact assistant in contact with the end portion of the first sensing electrode at the contact hole,
wherein the contact assistant is disposed in a same layer as the second sensing electrode.

9. The display device of claim 7, wherein:
at least a portion of the insulating layer corresponding to the piezoelectric elements is removed.

10. The display device of claim 1,
further comprising a sealant disposed between the first substrate and the second substrate.

11. The display device of claim 10, further comprising:
a plurality of neighboring piezoelectric elements disposed overlapping the sealant; and
a third sensing electrode overlapping the neighboring piezoelectric elements, the third sensing electrode being configured to transfer a sensing voltage generated as a result of pressure applied to the neighboring piezoelectric elements.

12. The display device of claim 11, wherein:
the third sensing electrode is disposed in a same layer as the first sensing electrode.

13. A method of manufacturing a display device, the method comprising:
forming a plurality of thin film transistors on a first substrate;
forming a plurality of pixel electrodes electrically connected to each of the plurality of thin film transistors;
forming protruding portions protruding from a second substrate and overlapping one of the plurality of thin film transistors;
forming a plurality of piezoelectric elements overlapping each of the protruding portions;
forming a first sensing electrode overlapping a piezoelectric element of the piezoelectric elements; and
forming a second sensing electrode overlapping the first sensing electrode,
wherein the first sensing electrode and the second sensing electrode intersect at a position corresponding to the protruding portion and the thin film transistor,
wherein the piezoelectric element, the first sensing electrode, and the second sensing electrode that are disposed on the second substrate are separated from the thin film transistor that is disposed on the first substrate by the protruding portion, and
wherein the first sensing electrode and the second sensing electrode are configured to transfer a sensing voltage generated by the piezoelectric element in response to a pressure applied to the piezoelectric element caused by a touch.

14. The method of claim 13,
wherein the second substrate faces the first substrate, and
wherein the protruding portion comprises a spacer for maintaining a distance between the first substrate and the second substrate.

15. The method of claim 13,
further comprising: bonding the first substrate and the second substrate using a sealant.

16. The method of claim 13,
wherein the piezoelectric element is interposed between the first sensing electrode and the second sensing electrode.

17. The method of claim 13, wherein:
forming the second sensing electrode further comprises forming a common electrode on the second substrate.

18. The method of claim 13, further comprising:
forming an insulating layer disposed between the first sensing electrode and the second sensing electrode for insulating the first sensing electrode from the second sensing electrode.

19. The method of claim 18, further comprising:
patterning the insulating layer to form a contact hole for exposing an end portion of the first sensing electrode; and
forming a contact assistant in contact with the end portion of the first sensing electrode at the contact hole,
wherein the contact assistant is formed in a same layer as the second sensing electrode.

20. The method of claim 18, further comprising:
removing at least a portion of the insulating layer corresponding to the piezoelectric elements.

* * * * *